(12) United States Patent
Power et al.

(10) Patent No.: US 10,257,463 B2
(45) Date of Patent: *Apr. 9, 2019

(54) MULTIFUNCTIONAL CONFERENCING SYSTEMS AND METHODS

(71) Applicant: COVIDIEN LP, Mansfield, MA (US)

(72) Inventors: James M. Power, Crownsville, MD (US); Scott A. Licursi, Plantsville, CT (US)

(73) Assignee: COVIDIEN LP, Mansfield, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/904,558

(22) Filed: Feb. 26, 2018

(65) Prior Publication Data

US 2018/0192004 A1 Jul. 5, 2018

Related U.S. Application Data

(63) Continuation of application No. 15/434,614, filed on Feb. 16, 2017, now Pat. No. 9,924,137, which is a continuation of application No. 13/768,457, filed on Feb. 15, 2013, now Pat. No. 9,584,760.

(60) Provisional application No. 61/599,862, filed on Feb. 16, 2012.

(51) Int. Cl.
*H04N 7/14* (2006.01)
*H04N 7/15* (2006.01)
*H04L 29/06* (2006.01)

(52) U.S. Cl.
CPC .......... *H04N 7/15* (2013.01); *H04L 65/4076* (2013.01)

(58) Field of Classification Search
None
See application file for complete search history.

(56) References Cited

U.S. PATENT DOCUMENTS

| | | | |
|---|---|---|---|
| 5,594,859 A | 1/1997 | Palmer et al. | |
| 5,608,653 A | 3/1997 | Palmer et al. | |
| 5,617,539 A | 4/1997 | Ludwig et al. | |
| 5,689,641 A | 11/1997 | Ludwig et al. | |
| 5,704,042 A | 12/1997 | Hester et al. | |
| 5,758,079 A | 5/1998 | Ludwig et al. | |

(Continued)

FOREIGN PATENT DOCUMENTS

| | | |
|---|---|---|
| JP | 2009-075871 A | 4/2009 |
| KR | 10-2007-0093068 | 9/2007 |

(Continued)

OTHER PUBLICATIONS

Chinese Office Action issued in Appl. No. CN 201380014491.9 dated Jul. 17, 2018, together with English language translation (9 pages).

(Continued)

*Primary Examiner* — Quoc D Tran

(57) ABSTRACT

A conferencing system for providing remote assistance according to the present disclosure includes a service requester device configured to execute a service requester application, a service provider device configured to execute a service provider application and a server application executing on a computer server remotely located from the service requester and service provider devices, the service requester and service provider applications are configured to dynamically connect to each other through the at least one server application.

14 Claims, 11 Drawing Sheets

(56) References Cited

U.S. PATENT DOCUMENTS

| | | |
|---|---|---|
| 5,767,897 A | 6/1998 | Howell |
| 5,802,294 A | 9/1998 | Ludwig et al. |
| 5,819,038 A | 10/1998 | Carleton et al. |
| 5,838,313 A | 11/1998 | Hou et al. |
| 5,838,914 A | 11/1998 | Carleton et al. |
| 5,854,893 A | 12/1998 | Ludwig et al. |
| 5,867,654 A | 2/1999 | Ludwig et al. |
| 5,870,547 A | 2/1999 | Pommier et al. |
| 5,872,923 A | 2/1999 | Schwartz et al. |
| 5,884,039 A | 3/1999 | Ludwig et al. |
| 5,896,500 A | 4/1999 | Ludwig et al. |
| 5,915,091 A | 6/1999 | Ludwig et al. |
| 5,920,693 A | 7/1999 | Burkman et al. |
| 5,920,694 A | 7/1999 | Carleton et al. |
| 5,923,844 A | 7/1999 | Pommier et al. |
| 5,938,724 A | 8/1999 | Pommier et al. |
| 6,008,804 A | 12/1999 | Pommier et al. |
| 6,038,257 A | 3/2000 | Brusewitz et al. |
| 6,046,761 A | 4/2000 | Echerer |
| 6,317,039 B1 | 11/2001 | Thomason |
| 6,343,314 B1 | 1/2002 | Ludwig et al. |
| 6,373,855 B1 | 4/2002 | Downing et al. |
| 6,381,557 B1 | 4/2002 | Babula et al. |
| 6,434,572 B2 | 8/2002 | Derzay et al. |
| 6,449,001 B1 | 9/2002 | Levy et al. |
| 6,583,806 B2 | 6/2003 | Ludwig et al. |
| 6,602,185 B1 | 8/2003 | Uchikubo |
| 6,662,210 B1 | 12/2003 | Carleton et al. |
| 6,665,872 B1 | 12/2003 | Krishnamurthy et al. |
| 6,675,131 B2 | 1/2004 | Hahn |
| 6,690,273 B2 | 2/2004 | Thomason |
| 6,699,187 B2 | 3/2004 | Webb et al. |
| 6,731,324 B2 | 5/2004 | Levy |
| 6,816,626 B1 | 11/2004 | Fadel |
| 6,898,620 B1 | 5/2005 | Ludwig et al. |
| 6,947,411 B2 | 9/2005 | Parker et al. |
| 6,985,576 B1 | 1/2006 | Huck |
| 7,007,098 B1 | 2/2006 | Smyth |
| 7,088,813 B1 | 8/2006 | Brand et al. |
| 7,139,381 B2 | 11/2006 | McCormack |
| 7,185,054 B1 | 2/2007 | Ludwig et al. |
| 7,260,498 B2 | 8/2007 | Battenfelder et al. |
| 7,383,158 B2 | 6/2008 | Krocker et al. |
| RE40,704 E | 4/2009 | Riddle |
| 7,996,776 B2 | 8/2011 | Parker et al. |
| 8,108,182 B2 | 1/2012 | Murray |
| 9,584,760 B2 * | 2/2017 | Power ................ H04L 65/4076 |
| 9,924,137 B2 * | 3/2018 | Power ................ H04L 65/4076 |
| 2002/0172498 A1 | 11/2002 | Esenyan et al. |
| 2003/0144004 A1 | 7/2003 | Canova et al. |
| 2005/0121505 A1 | 6/2005 | Metz et al. |
| 2007/0273751 A1 | 11/2007 | Sachau |
| 2008/0147089 A1 | 6/2008 | Loh et al. |
| 2008/0291260 A1 | 11/2008 | Dignan et al. |
| 2008/0316036 A1 | 12/2008 | Nixon |
| 2009/0040948 A1 | 2/2009 | Wengrovitz et al. |
| 2009/0243833 A1 | 10/2009 | Huang et al. |
| 2009/0317002 A1 | 12/2009 | Dein |
| 2010/0149308 A1 | 6/2010 | Mihara |
| 2010/0238194 A1 | 9/2010 | Roach, Jr. |
| 2011/0010397 A1 | 1/2011 | Kathpal |
| 2011/0107238 A1 | 5/2011 | Liu et al. |
| 2011/0213210 A1 | 9/2011 | Temby et al. |
| 2011/0249081 A1 | 10/2011 | Kay et al. |
| 2011/0305376 A1 | 12/2011 | Neff |
| 2012/0030129 A1 | 2/2012 | Kim et al. |
| 2013/0147899 A1 | 6/2013 | Labhard |
| 2013/0218137 A1 | 8/2013 | Abovitz et al. |

FOREIGN PATENT DOCUMENTS

| | | |
|---|---|---|
| KR | 10-2010-0014406 | 2/2010 |
| KR | 2010-0019659 A | 2/2010 |
| KR | 10-2010-0116561 | 11/2010 |
| WO | 00/55714 A1 | 9/2000 |

OTHER PUBLICATIONS

International Search Report from PCT Appl. No. PCT/US2013/043424 dated Sep. 25, 2011.

International Search Report dated Jun. 25, 2013 in copending International Application No. PCT/US2013/026400.

Extended European Search Report from Appl. No. 13749101.5 dated Oct. 12, 2015.

European Examination Report dated Apr. 9, 2018 in Appl. No. EP 13 749 101.5 (9 pages).

* cited by examiner

MULTIFUNCTIONAL CONFERENCING SYSTEMS AND METHODS

CROSS-REFERENCE TO RELATED APPLICATION

This application is a continuation application of U.S. patent application Ser. No. 15/434,614, filed on Feb. 16, 2017, which is a continuation application of U.S. patent application Ser. No. 13/768,457, filed on Feb. 15, 2013, now U.S. Pat. No. 9,584,760, which claims the benefit of, and priority to, U.S. Provisional Patent Application Ser. No. 61/599,862 filed on Feb. 16, 2012, the entire contents of each of which are incorporated by reference herein.

BACKGROUND

Technical Field

This disclosure relates generally to multifunctional conferencing systems and methods of use.

Background of Related Art

As is known in the art, teleconferencing systems, video conferencing systems, and web conferencing systems are used in a wide variety of settings to enable effective communication among local and remote sites. Each of the local and remote sites have a teleconferencing system (including a telecommunication device with a loudspeaker and microphone), a video conferencing system (including a video camera, a video monitor, a loudspeaker and a microphone), and/or a web conferencing system (including a web-connected computer and video monitor, and may include a loudspeaker, microphone and video camera). At least one site includes a director controller that enables a director/host to control the distribution of signals (audio, video and/or information) produced at each of the sites for viewing and/or listening by the participants at the other sites.

For example, a web conference system includes a host that selects which site and/or sites to transmit the video information signals to the other sites. The host may also select which participant(s) is capable of sharing information with the other participant(s) or the host may provide the control of the web conference system to another participant. As such, the host may act as an instructor, a moderator or a participant.

SUMMARY

The present disclosure is directed to an improved multifunctional conferencing system and methods of use. A conferencing system for providing remote assistance according to an embodiment of the present disclosure includes a service requester device configured to execute a service requester application, a service provider device configured to execute a service provider application and a server application executing on a computer server remotely located from the service requester and service provider devices. The service requester and service provider applications are configured to dynamically connect to each other through the server application.

The dynamic connection between the service requester and service provider devices is dependant on the bandwidth of the connection therebetween. The server application dynamically selects a connection between the service requester and service provider devices wherein the connection is selected between an audio connection, an audio and video connection, an audio and still image connection and a SMS messaging connection. A mode of connection between the service requester device and the server application is selected from a wi-fi communication network and a wireless phone communication network.

A conferencing system for providing remote assistance according to an embodiment of the present disclosure includes a service requester device networked with a service provider device through a server application. The service requester device includes a video camera, a video monitor, a speaker and a microphone, and the service provider device is configured to enable and/or disable one of the video camera, the video monitor, the speaker and the microphone.

The service provider device may be configured to direct content to the video monitor of the service requester device. The service provider device enables the video camera and receive a stream of images generated by the video camera. The steam of images is streamed to the service provider device through the network formed between the service requester and service provider devices. The service provider device is configured to capture a captured image from the stream of images. The service provider device displays the captured image on the video monitor of the service requester device. The pixel resolution of the captured image may be greater than the pixel resolution of each image forming the stream of images. The service provider device is configured to display an annotation on the video monitor of the service requester device and configured to display content on the video monitor of the service requester device. The displayed content may include video, an image and/or a text document.

A conferencing system for providing remote assistance according to an embodiment of the present disclosure includes a service requester device configured to execute a service requester application, a plurality of service provider devices each configured to execute a service provider application and a server application executing on a computer server remotely located from the service provider and service requester devices, the service requester application configured to simultaneously connect to the plurality of service provider devices.

The plurality of service provider devices may be dynamically selected by the service requester device. The dynamic selection of the plurality of service provider devices may be related to a dynamic selection parameter selected by a user on the service requester device. The dynamic selection parameter may be selected from a selected instrument or device, a selected location, a selected description of needed assistance, a selected medical procedure, an identifying feature and an identification code. The dynamic selection of the plurality of service provider devices may be related to a dynamic selection parameter generated by the service requester device such as global position coordinate and/or a wireless network coordinate.

BRIEF DESCRIPTION OF THE DRAWINGS

Example embodiments in accordance with the present disclosure are described herein with reference to the drawings wherein.

DETAILED DESCRIPTION

Figure 1:
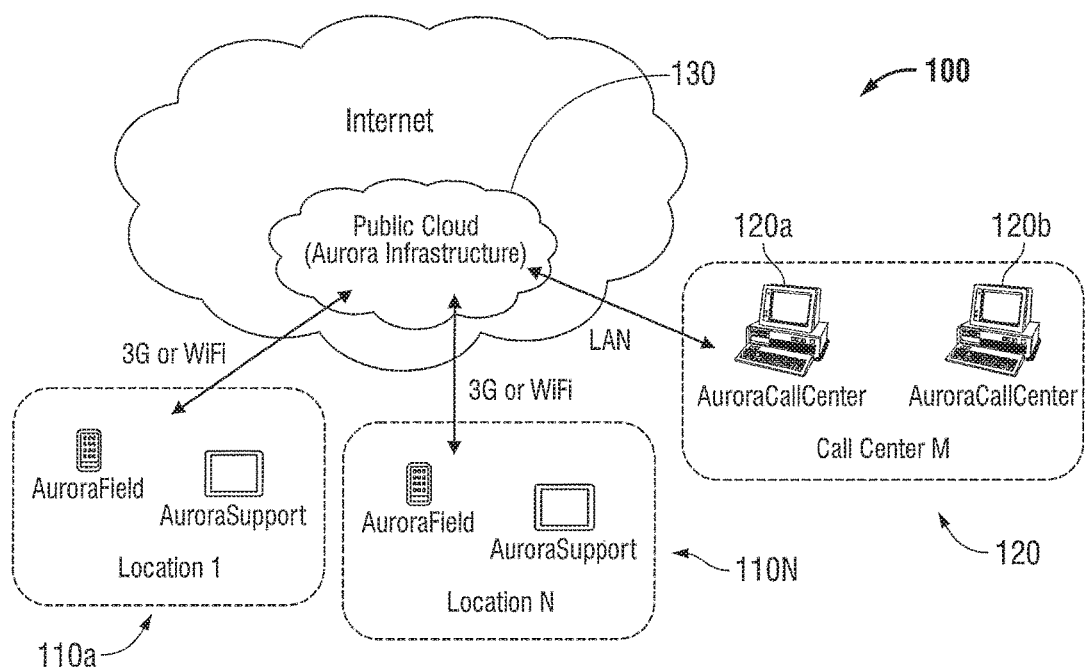
FIG. 1 illustrates a service communication network in accordance with the present disclosure that includes a service requester connected to a service provider through one or more server applications residing on a cloud-based server.

Reference will now be made in detail to various embodiments, examples of which are illustrated in the accompanying drawings. In the following detailed description, numerous specific details are set forth in order to provide a thorough understanding of the present disclosure. It will be apparent to one of ordinary skill in the art that the present disclosure may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the present disclosure.

The terminology used in the description of the disclosure herein is for describing particular embodiments only and is not intended to be limiting of the disclosure. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the terms "service requester device" and "service provider device" refer to multifunctional communication devices that include user interfaces. One or more of the multifunctional communication devices may be a portable communication device such as a mobile phone, a Smartphone, a personal digital assistant (PDA), a tablet computer and/or a wrist-mounted computer. The multifunctional communication devices include hardware supported by a variety of applications, such as telephone applications, video conferencing applications, e-mail applications, instant messaging applications, digital camera applications, digital video camera applications, web browsing applications, digital music player applications, and/or digital video player applications.

Multifunctional communication device may include two or more components that work in conjunction with each other to provide the functionality of a single portable communication device. For example, multifunctional communication device may include a separate audio earpiece, a separate eyepiece that captures and/or displays video and a separate processing unit that communicates with the other components via a wired and/or wireless communication network.

The applications may be executed on the multifunctional communication device and may use at least one common physical user-interface device, such as the touch screen. Applications may include the following modules (or sets of instructions), or a subset or superset thereof: a telephone module; a video conferencing module; an e-mail client module; an instant messaging (IM) module; a camera module for still and/or video images; an image management module; a video player and/or recorder module; a audio player and/or recorder module; and/or a browser module. Modules may be configured to interface with one or more hardware components in the Multifunctional communication device.

The multifunctional communication device may include RF (radio frequency) circuitry that receives and sends RF signals. The RF circuitry converts electrical signals to/from electromagnetic signals and communicates with communications networks and other communications devices via the electromagnetic signals. The RF circuitry may include well-known circuitry for performing these functions, including but not limited to, an antenna system, an RF transceiver, one or more amplifiers, a tuner, one or more oscillators, a digital signal processor, a CODEC chipset, a subscriber identity module (SIM) card, memory, and so forth. The RF circuitry may communicate with networks, such as the Internet, also referred to as the World Wide Web (hereinafter, "WWW"), an intranet and/or a wireless network, such as a cellular telephone network (Telnet), a wireless local area network (LAN) and/or a metropolitan area network (MAN), and other devices that utilize wireless communication. The term wireless communication may also include any of a plurality of communications standards, protocols and technologies, including but not limited to, Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi- MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The multifunctional communication device may include audio circuitry, a speaker, and a microphone that provides audio interface between a user and the multifunctional communication device. The audio circuitry receives audio data, converts the audio data to an electrical signal, and transmits the electrical signal to the speaker. The speaker converts the electrical signal to human-audible sound waves. The audio circuitry also receives electrical signals converted by the microphone from sound waves. The audio circuitry converts the electrical signal to audio data and transmits the audio data for processing. Audio data may be retrieved from and/or transmitted to memory and/or the RF circuitry by the peripherals interface. Audio circuitry may include a headset jack that provides an interface between the audio circuitry and removable audio input/output peripherals, such as output-only headphones or a headset with both output (e.g., a headphone for one or both ears) and input (e.g., a microphone).

The multifunctional communication device may include an input/output peripheral such as the touch screen or other input or control devices such as physical buttons (e.g., push buttons or rocker buttons), dials, slider switches, joysticks, click wheels, and so forth. The multifunctional communication device may be coupled to any (or none) of the following: a keyboard (e.g., QWERTY), infrared port, USB port, and/or a pointer device such as a mouse. The one or more buttons may include an up/down button for volume control of the speaker and/or the microphone. The one or more buttons may include a push button configured to disengage or lock the touch screen. The touch screen is used to implement virtual or soft buttons and one or more soft keyboards.

The touch-sensitive touch screen provides an input interface and an output interface between the multifunctional communication device and a user. The multifunctional communication device receives and/or sends electrical signals from/to the touch screen. The touch screen displays visual output to the user. The visual output may include graphics, text, icons, video, and any combination thereof (collectively termed "graphics"). Some or all of the visual output may correspond to user-interface objects, further details of which are described below.

In some embodiments, the multifunctional communication device includes hardware components and software stored in memory configured to interface with the hardware components. One hardware component may include a global positioning system (GPS) module 135 that determines the location of the multifunctional communication device and provides this information for use in various hardware and/or applications (e.g., to telephone, camera, contact/motion module).

In conjunction with an imaging module that includes one or more optical sensors to capture still images or video. In some embodiments, an optical sensor is located on the back of the device, opposite the touch screen display on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor can be changed by the user (e.g., by rotating the lens and the sensor in the device housing) so that a single optical sensor may be used along with the touch screen display for both video conferencing and still and/or video image acquisition.

Referring now to FIG. 1, a service communication network 100 in accordance with the present disclosure is shown. The service communication network 100, in the simplest configuration, includes a service requester 110a, 110n that connects to a service provider 120a, 120n through one or more server applications residing on one or more servers. In the service communication network 100, the service requester is typically an individual requesting technical or professional assistance. For example, the service requester 110a, 110n may be an on-site distributor, technician or troubleshooter or the service requester 110a, 110n may be an end-product user such as a doctor, or other hospital personnel, or the service requester 110a, 110n may be an end-user consumer.

The server applications that provide connections between the individual service requesters 110a, 110n and the service providers 120a, 120n may reside on any public cloud-computing service 120 (hereinafter "The Cloud 130"). While The Cloud 130 provides a service that executes the service communication network server applications rather than providing a dedicated identifiable server (e.g., hardware) to execute the server application, one or more dedicated servers, or a fractional portion of their computing capability, may be utilized to execute the server applications and to provide functionality described herein.

The service communication network 100 may also function as a peer-to-peer system (e.g., without a special purpose server executing the server application) wherein the functionality of the server applications described herein is incorporated into the service provider 120a, 120n. Alternatively, the functionality of the server applications and the functionality of the service provider application described herein may be assigned and executed in any suitable distribution between the various computing engines (e.g., The Cloud 130, the service requester device and/or the service provider devices).

FIG. 1 illustrates a service requester 110a at Location 1 connected to a first service provider 120a assigned to provide support for Location 1 and a service requester 110n at Location N connected to a second service provider 120n assigned to provide support for Location N. The first service provider 120a and the second service provider 120n, while assigned to support Location 1 and Location N, respectively, each are not necessarily located at the respective locations when the request from the service requester 110a, 110n is made. The service communication network 100 may also connect a service requester 100a, 110n to a service provider 100a, 110n physically located at a centralized call center. The service communication network 100 is scalable and may be configured to connect any number of service requesters 110a, 110n at different locations to service providers 110a, 110n at different locations or service provides 110a, 110n at one or more call centers.

Figure 2:
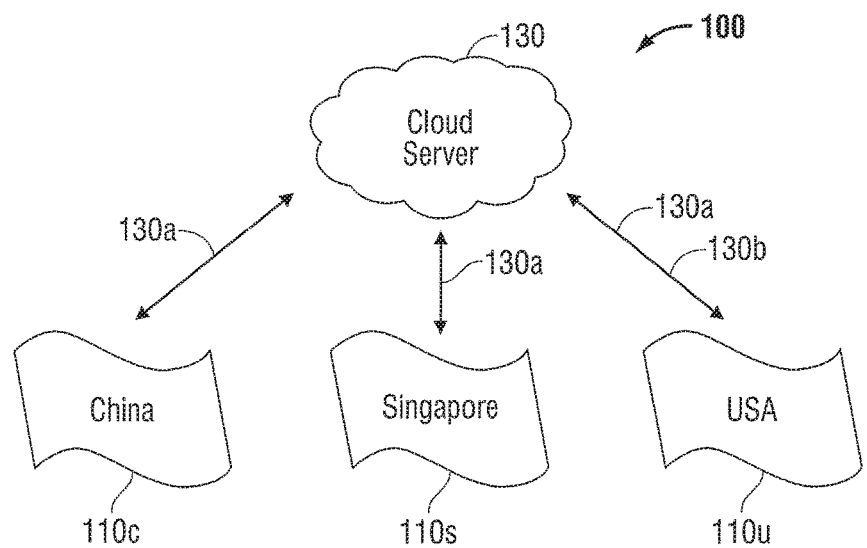
FIG. 2 illustrates a service communication network that includes service requesters located in various locations and connected to service providers through cloud-based servers.

Executing the server applications of the service communication network 100 in The Cloud 130 enables the server applications to be distributed through the computer networks in The Cloud 130. As illustrated in FIG. 2, service communication network 100 includes one or more requester communication networks 130a and service provider networks 130b. The requester communication networks 120a connect a service requester 110c, 110s and 110u to The Cloud 130 and a provider communication network 130b connects a service provider 120u to The Cloud 130. The connection between a service requesters 110c, 110s, 110u and the service provider 120u (e.g., individual service providers or call service providers at a dedicated call center) may be performed through The Cloud 130 thereby removing any geographical barriers therebetween.

Figure 3:
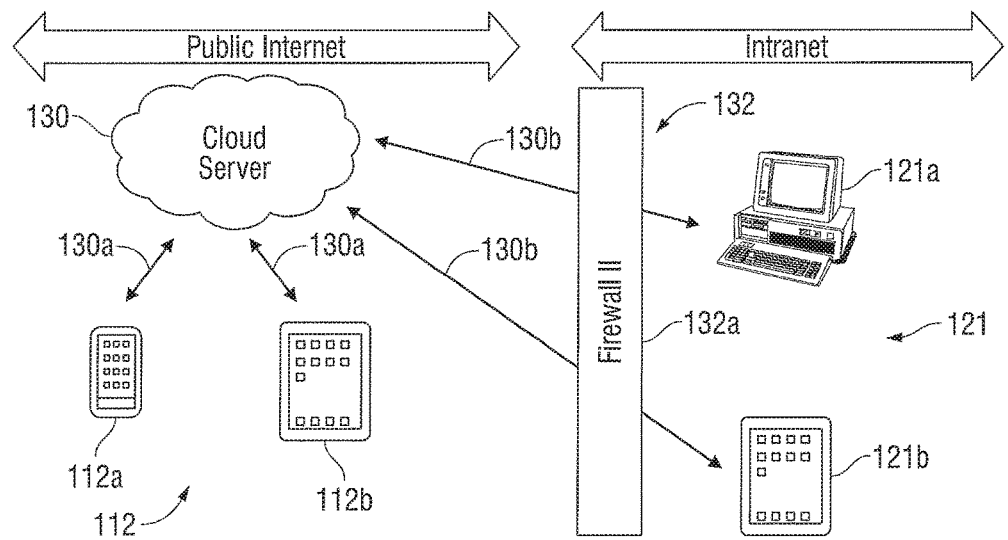
FIG. 3 illustrates a plurality of service requester devices and a plurality of service provider devices that connect to each other through a suitable communication network.

As illustrated in FIG. 3, a service requester is provided with a service requester device 112a, 112b (as defined and described herein) configured to connect to The Cloud 130 via a requester communication network 130a (e.g., WiFi, WWW, Telnet, LAN, MAN or any other suitable communication network). The service requester device 112a, 112b may be configured to detect the most suitable network within the requester communication network 130a. In one embodiment, the service requester device 112a, 112b selects the most suitable network within the requester communication network 130a based on bandwidth. In another embodiment, the service requester device 112a, 112b selects the most suitable network based on reliability. In another embodiment, the service requester device 112a, 112b selects the most suitable network based on the wireless telephone technology available (e.g., 2G, 2.5G, 2.75G, 3G and 4G). The service requester device 112a, 112b is configured to enable and disable services and functionality based on one or more conditions of the service communication network 100 and/or one or more conditions of the requester communication network 130a.

The service provider may be provided with a service provider device 121a, 121b. The service provider device 121a, 121b may be a Smartphone, a tablet computer, or a personal computer, such as a laptop computer and/or desktop computer (as defined and described herein) configured to connect to The Cloud 130 via a requester communication network 130b. The service provider device 121a, 121b may also interface and/or interconnect with a personal computer thereby providing the flexibility and functionality of a mobile communications device and the processing and networking capability of the personal computer.

As discussed hereinabove, the service requester device 112a, 112b and/or service provider device 121a, 121b may be configured to dynamically select from one or more available communication networks based on one or more properties of the service communication network 100 as described herein.

Service provider device 121a, 121b connects to The Cloud 130 via a service communication network 130b (WiFi, WWW, Telnet, LAN, MAN or any other suitable communication network). In another embodiment, service provider is located in a service provider call center and connects to The Cloud 130 via a high-speed LAN or other suitable high-speed network.

Requester device 122a, 122b and/or service provider device 121a, 121b may connect to The Cloud 130 through one or more Firewalls 132a or other program and/or system serving as a network gatekeeper. In some instances, the service provider device 121a, 121b may be required to connect through the same firewall 132a multiple times. In one embodiment, the service requester device 121a, 121b and/or the service provider device 121a, 121b bypasses one or more firewalls after a suitable connection to The Cloud 130 is established.

Figure 4:
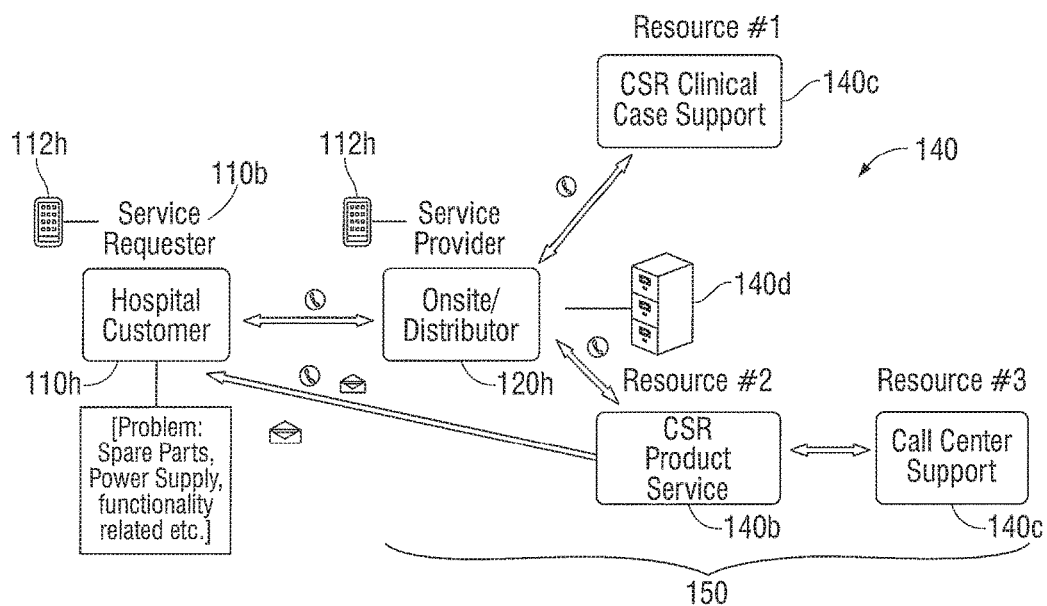
FIG. 4 illustrates a service requester that connects to a service provider through a cloud-based server and connects indirectly to other resources provided through the service provider.

As illustrated in FIG. 4, a service requester 110h (e.g., a Hospital Customer) connects to the service provider 120h (e.g., Onsite Distributor assigned to the service requester's hospital). The service provider 120h, in addition to the connection to the service requester 110h, may also connect other resources 140 through the service communication network 100. In one embodiment, the service provider 120h may connect to, and receive support from, a team member of the CRS Clinical Case Support team 140a assigned as a resource 140 to the service provider 120h or assigned as a resource 140 to the Hospital Customer 110h. In another embodiment, the service provider 120h may connect to, and receive support from a team member of the CSR Product Service team 140b assigned as a resource 140 to the service provider 120h or assigned as a resource 140 to the Hospital Customer 110h. In yet another embodiment, a CRS Product Service team member 140b may connect to, and receive support from, a member of the Call Center Support team 140c. As such, the service requester 110h is directly connected with the service provider 120h and indirectly connected to the various resources available to the service requester 120h (e.g., CRS Clinical Case Support 140a, CSR Product Service 140b and Call Center Support 140) through the service requester 120h.

Each service requester 110h is assigned to a service provider group 150. The service provider group 150 includes one or more service providers 120h and resources 140 that may be required to provide assistance to the service requester 110h. The service providers 120h and/or resources 140 assigned to the service provider group 150 may include individuals with particular expertise and experience (subject matter experts), individuals with particular interest in providing exceptional service to the service requester 110h (sales, service and management) or individuals that have provided past services to the service provider 120h and/or the service requester 120h.

Resources 140 assigned to the service requester 110h and/or provided to the service provider group 150 may include service requester information 140d. Service requester information 140d includes information related to the service requester 110h selected from one or more databases. The service requester information 140d may include log data/reports from past service requests, past and projected sales data related to the service requester 110h (e.g., location and/or facility of the service requester 110h), information related to the products provided to the service requester 110h and/or service provider 120h (e.g., products in inventory at the location and/or facility) and/or data related to past or future training information related to the service requester 110h.

Selection/assignment of members and/or resources 140 in a service provider group 150 is not limited by geographical location or availability of a network connection. The members and/or resources 140 may connect to The Cloud 130 through any available network connection regardless of location. Alternatively, the members and/or resources 140 may connect directly to the service provider 120h through any other web-based or telecommunication based network as will be described in detail below.

The members and resources 140 of the service provider group 150 may be dynamically selected. The service requester 110h and/or the service provider 120h may select information related to the nature and/or purpose of the specific service request and the service communication network 100 may assign and/or reassign resources 140 based on the selected information. For example, the service requester 110h may be a field service representative responsible for demonstrating a first product and assigned to a service provider group 150 related to the first product. In order to provide good service, the service requester 110h may be required to demonstrate a second product unrelated to the first product. A service provider group 150 related to the second product may be temporarily assigned to the service requester 110h (e.g., field service representative) and may provide assistance to the service requester 110h in demonstrating the second product unrelated to the first product.

The dynamic selection of the service provider group 150 may be related to GPS coordinates provided by the service requester device 112h. For example, the service requester device 112h may provide a GPS coordinate or wireless network coordinate to the service communication network 100. Resources 140 outside of the service provider group 150 located proximate to the service requester 110h may be identified, notified and/or temporarily assigned to the service provider group 150. For example, a service requester 110h may request services from its service provider group 150 and a resource outside of the service provider group 150 and local to the service requester 110h may be identified, assigned to the service provider group 150 and directed (or re-directed) to provide on-site service to the service requester 110h.

In another embodiment, the service provider 120h and/or service requester 110h is dynamically directed to, or redirected to, a service and/or repair team. For example, service requester information 140 of the service requester 110h and/or the service requester device 112h may identify equipment proximate the service requester 110h that requires service and/or repairs. Identification of equipment proximate to the service requester device 112h is described in detail below. In yet another embodiment, the service provider 120h is connected with an individual located nearby the service requester 110h based on GPS information provided by the service requester 110h and/or provided by the service requester device 112h.

The resources 140 provided and/or required for each service communication network 100 are related to the nature of the particular business. For example, resources 140 for a medical product company may include product expert resources, product supply resources, clinical trial experts and patient care resources while resources for a manufacturing company may include OEM equipment experts, repair and part replacement resources, raw material supplier resources and material and product supply chain resources that support a particular manufacturing line or process.

In one embodiment, a medical supply company provides a first team of resources to facilitate service requests from medical doctors requesting services, a second team of resources to facilitate service requests from field service product representatives and a third team of resources to facilitate service requests from field repair representatives.

Figure 5:
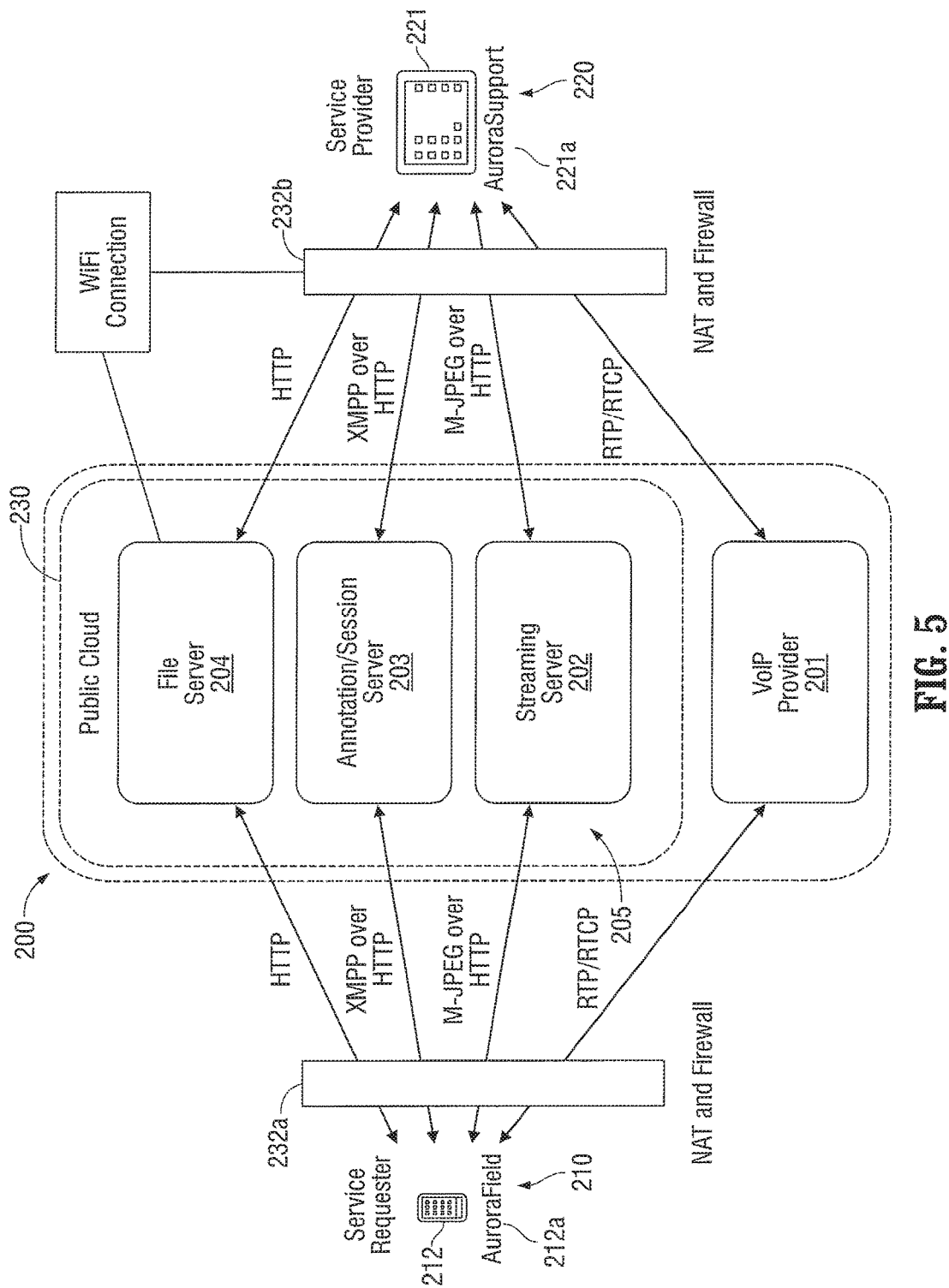
FIG. 5 illustrates service communication network architecture with a VoIP Provider application, an MPEG over HTTP Streaming Servers application, a connection through an XMPP over HTTP Annotation/Session Server application and an HTTP File Server Application.

FIG. 5 illustrates one communication model between a service requester application 212a (e.g., aurorafield 212a residing and executing on the server requester device 212) and a service provider application 221a (e.g., aurorasupport 221a residing and executing on the service provider device 221). The service requester device 212 and service provider device 221 are illustrated as being protected by a Firewall with Network Address Translation (NAT) 232a, 232b although the service communication network 200 does not necessarily require a Firewall 232a, 232b or Firewall protection. The communication architecture includes a connection through a VoIP Provider application 201, a connection through an MPEG over HTTP Streaming Servers application 202, a connection through an XMPP over HTTP Annotation/Session Server application 203 and an HTTP File Server Application 204.

Systems, protocols, file types and formats provided and described herein are provided as exemplary systems, protocols, file types and/or format. As such, the specific system, protocol, file type, and/or format should not be constructed as limiting as other suitable systems, protocols, file types and formats are readily available and, under many circumstances, interchangeable with the systems, protocols, file types and/or formats discussed herein. For example, the transmission of MPEG audio and/or video over a Real-time Transport Protocol (RTP) may be interchanged with any suitable format (e.g., MPEG-4, MJPEG, H.264, etc.) using any suitable protocol.

One data stream includes the VoIP Provider 201 through which standardized packets are transmitted in the real-time transport protocol (RTP) used in conjunction with the RTP Control Protocol (RTCP). The RTP/RTCP may be used for real-time streaming of voice and/or video between the service requester device 212 and the service provider device 221. The RTP/RTCP data stream may be configured through any suitable VoIP Provider. In another embodiment, at least one of one or more server applications 202-204 in The Cloud 230 performs the VoIP functions.

Another data stream includes an MPEG over HTTP Streaming Server application 202 that streams data using a standard Hypertext Transfer Protocol (HTTP) configured to transmit MPEG data through the streaming server application 202 that resides in The Cloud 230.

Yet another data stream includes an XMPP over HTTP Annotation/Session Server application 203 that streams data using Extensible Messaging and Presence Protocol (XMPP) configured to transmit near real-time messaging and VoIP. XMPP, also known as Jabberd, executes through the annotation/session server application 203 and provides a gateway to access networks using other protocols such as SMS or Email. The service requester application 212a and service provider application 221a each register with the annotation/session server application 203. The annotation/session server application 203 authenticates the individual user, opens a server session and provides the service requester application 212a and/or the service provider application 221a with information required to continue and/or maintain the server session and complete the launch the service requester application 212a and service provider application 221a. Information provided to the service requester application 212a and service provider application 221a may include session initiation protocol (SIP) information, Video Proxy information, User Information, and Jabberd Information.

Yet another data stream includes an HTTP connection through a file server application 204.

Service requester device 212 is configured to execute a service requester application 212a and service provider device 221 (e.g., a computer or tablet) is configured to execute a service provider application 221a. The service requester application 212a and service provider application 221a each interact with the various components and features of the respective device 212, 221, and each device 212, 221 connect with The Cloud 230 (e.g., the one or more server applications 202-204 residing on one or more servers in The Cloud 230). The service provider application 221a is described in general terms and no distinctions are made as to whether the service provider application 221a is executing on a multifunctional communication device or executing on a personal computer. It is understood that each device requires different programming and includes different functionality or may require different hardware to provide comparable functionality.

Launching the service requester application 212a (or the service provider application 221a) establishes a connection between the Annotation/Session Server 203 and the service requester device 212 (or service provider device 221). In one embodiment, the Annotation/session server 203 provides a centralized location for all application level settings for the service communication network 200. A central location for the application level settings allows an administrator of the service communication network 200 to have control over the application behavior. A central location also allows the administrator of the service communication network 100 to be able to manage the devices that use each application. Providing a central location prevents unauthorized access of the service communication network 200 by a device that is not registered with the system and/or authorized to utilize the service communication network 200. The centralized location for all application level settings for the service communication network 200 may be incorporated into any suitable server and/or incorporated into any suitable application that resides and executes in The Cloud 230.

The service requester device 212 and/or service provider device 221 receive user information from the annotation/session server 203 and registers/authenticates the user. If the authentication request sent to the server is already registered, the username and password provided by the service requester device 212 and/or the service provider device 221 are matched against the username and password stored on the session server 203. If, however, the user is not registered, a not authenticated error message is generated, a request to register is sent and a subsequent authorization with a username/password at the device 221, 212 is required to configure the device 221, 212 for the session server 203.

The XMPP JID (Extensible Messaging and Presence Protocol, e.g., JabberID) is defined by the service communication network 200 administrator who registers at the session server 203 each service requester device 212 and service provider device 221 authorized to utilize the service communication network 200. The messaging protocols described herein are provided as exemplary protocols and may be interchanged with any suitable messaging protocol.

After launching the service requester application 221a and/or service provider application 221a and establishing the required connections to The Cloud 230, the service requester device 212 and the service provider device 221 are ready to initiate and/or join a request for service. In one embodiment, a service request may only be initiated by a service requester 210. In another embodiment, a service provider 220 may initiate a restricted connection with a service requester 210 wherein the functionality of the service communication network 200 is limited. For example, the restricted connection may be limited to a SMS message or a VoIP connection. In another embodiment, the service requester 210 or service provider 220 may initiate a restricted connection and the service requester 210 is provided with the ability to enabling further capabilities of the service communication network 200.

Prior to initiating a request for service, the service requester 210 may provide information related to the needed assistance. The service requester application 212a may provide selections related to the type of assistance needed (e.g., clinical, technical, sales, upgrade, and repair). The service requester application 212a may provide selections related to the type of equipment being used by the service requester 210. The service requester application 212a may provide a series of instructions that may be used to identify the type of equipment being used. Finally, the service requester application 212a may utilize one or more features of the service requester device 212 to identify the equipment proximate to the service requester 210, as described in detail below.

A service request is initiated by the service requester 210 by selecting a request for assistance icon, or other selection device, on the service requester device 212. The service requester application 212a sends a service request and the session initiation protocol identification (hereinafter, "SIP ID") and password (provided to the service requester application 212a from the annotation/session server 203 when the service requester application 212a was initiated). The service requester device 212 is registered with the SIP ID and connects with the annotation/session server 203 in The Cloud 230. The service request may also include information related to the service requester 210 and/or information related to the needed assistance. Information related to the service requester 210 may include geographical coordinates and/or information that uniquely identifies the service requester 210.

The service request and information from the service request device 212 is received by the annotation/session server 203 in The Cloud 230. In one embodiment, the annotation/session server 203 identifies the service requester 210 and selects a service provided group, as discussed hereinabove, suited for the service request. In one embodiment, the selected service provider group is the service provider group assigned to the service requester 210. In another embodiment, the selected service provider group is related to the information provided from the service requester device 212. Additional members and/or resources may be added to the selected service provider group based on the identification of the service requester 210 and/or information provided from the service requester device 212.

The annotation/session server 203 may compile data related to the service requester 210 and the compile data and/or the service requester information (described above) may be used to select the service provider group, assign additional members to the service provider group and/or remove members from the service provider group.

The members and resources in the selected service provider group are notified of the incoming service request. The notice may indicate that a service request is pending or the notice may indicate that a service request from the identified service requester 210 is pending. In one embodiment, the service provider device 221 retrieves information related to the service requester 210 from the annotation/session server 203. In one embodiment, a real-time HTTP request is made to the annotation/session server 203 to provide details for the service requester 210 assigned to the specified SIP ID.

At least one of the members of the selected service provider group receives a notification including an icon that allows the service provider 220 to accept the service request and initiate direct contact with the service requester 210. The remaining members and resources may receive a SMS notification, or similar electronic communication, indicating that the service requester 210 has initiated a service request. In another embodiment, two or more members of the selected service provider group receive an icon that allows the service provider 220 to accept the service request and initiate direct contact with the service requester 210. After a member accepts the service request, the remaining members and resources may receive a SMS notification, or similar electronic communication, identifying the service provider 220 that accepted the service request.

The service provider 220 that accepted the service request provides the SIP ID and password (provided to the service provided application 221a from the annotation/session server 203 when the service provider application 221a was initiated). The service provider device 221 is registered with the SIP and connects with the annotation/session server 203 in The Cloud 230. The service requester application 212a is notified that the call has been accepted and the service requester application 212a may make a real-time HTTP request to the annotation/session server 203 to obtain information related to the service provider 220 that accepted the service request (e.g., the SIP ID of the service provider 220).

The service requester application 212a and the service provider application 221a connect to each other through the Jabberd server and connect through the video proxy. The service requester application 212a initiates video and provides video to the service provider application 221a through the video proxy. The service requester application 212a sends an unfreeze jabber message to the service provider application 221a wherein the unfreeze message acts as a "ready-state" message to the service provider application 221a to prepared for an incoming video stream. Service provider application 221a requests a connection with the video proxy and the video proxy starts sending live stream video from the service requester application 212a to the service provider application 221a.

The initiation and initialization of the connection between the service requester application 212a and the service provider application 221a may be accomplished by other sequences and/or methods. For example, the connection may be a peer-to-peer connection wherein device identification information is pushed to one of the service requester application 212a and/or the service provider application 221a.

Service provider 220 makes appropriate inquiries to the service requester 210 to determine the purpose and nature of the service request. Service provider 220 may utilize the audio connection and video connection with the service requester 210. The nature and purpose of the service request may be related to any type of service including, but not limited to on-site training, operation of a specific device or equipment, providing sales information, troubleshooting of the problem, system or equipment. Specific examples include providing assistance with wiring or interconnecting equipment, providing instructions for use of equipment, providing documentation on a process or product, locating specific features on equipment, providing a plurality of operation steps for operation of equipment, providing safety instructions for equipment or for product use and handling, providing information related to sales of a product and viewing the operation of equipment.

Figure 6:
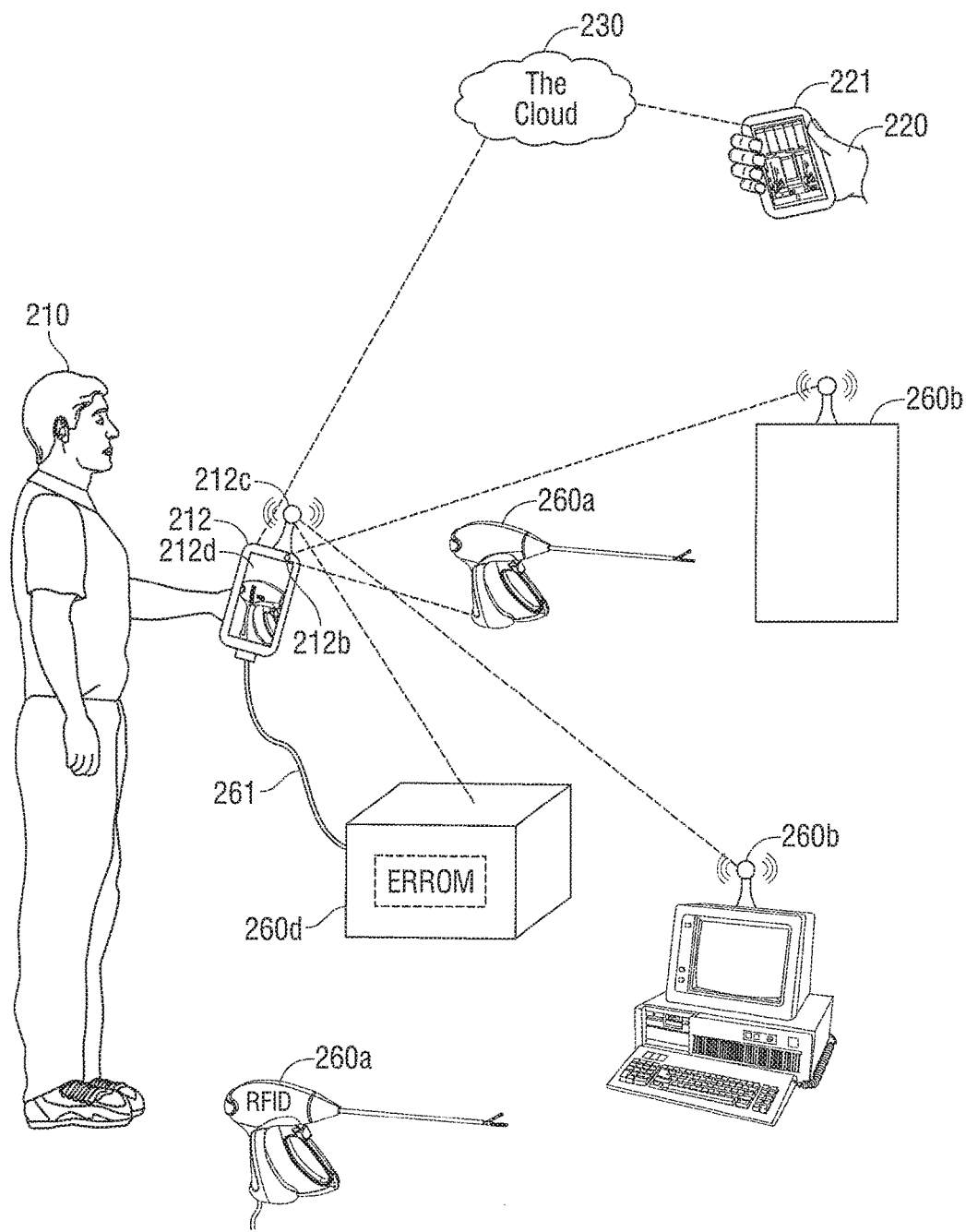
FIG. 6 illustrates systems and methods for identifying equipment proximate a service requester, wherein the systems and methods utilize one or more aspects of the service requester multifunctional communication device.

In many instances, one step in providing service requires proper identification of equipment being used by the service requester. FIG. 6 illustrates several systems and methods that may be utilize through the service communication network 200 to properly identify equipment proximate to the service requester. The service provider may utilize one or more aspects of the service requester multifunctional communication device 212 to identify equipment proximate the service requester 210.

In one embodiment, the service provider 220 may utilize the camera 212b on the service requester device 212 to identifiable equipment 260a, 260c. Service provider 220 may provide specific instructions to the service requester 210 to position the camera 212b on an identifiable feature of equipment 260a (e.g., position the camera such that the identifiable feature is in field of view of the camera 212b. Identifiable features may include a bar code, an identifying marker (e.g., model and serial number), an identifying color swatch, an identifying shape specific to the equipment 260a, 260c, and/or an identifying color bug (e.g., maker with specific shape and color combination). The camera 212b may also be used to capture an image of the one or more aspects or identifiable features of the equipment 260a, 260c.

In another embodiment, the camera 212b is utilized to capture a plurality of images in order to identify the equipment 260a, 260c. For example, a first image of the equipment 260a, 260c may be used or captured to narrow the number of possibilities. A second image may further narrow the number of possibilities and/or may positively identify the equipment 260a, 260c. In yet another embodiment, a third image may be required to further narrow the number of possibilities and/or positively identify the equipment 260a, 260c. In another embodiment, one or more images may be utilized to narrow the number of possibilities and a list of possibilities is provided to the service requester 210 for further identification.

In another embodiment, a resource (e.g., see FIG. 4 resource 140-140d) is provided to the service provider 220 and utilized to identify equipment in an inventory of equipment assigned to the service requester 210 and/or an inventory of equipment assigned to the location of the service requester 210. Equipment may be assigned to the service requester and/or location from sales records, service records, inventory records, equipment scanning and identification performed by service requester device 212 and/or records of past service requests.

In another embodiment, the service provider 220 may control of one or more aspects of the service requester device 212. For example, the service provider 220 may enable a wireless system 212c (e.g., wireless system such as a Bluetooth system or any other suitable wireless communication protocol) on the service requester device 212 and wirelessly connects to wireless enabled equipment 260b proximate the service requester 210 via a suitable wireless communication protocol. One step may utilize the wireless system 212c to perform an equipment survey to determine the available wireless enabled equipment 260b and operational status of the available wireless enabled equipment 260b. The available wireless enabled equipment 260b and the operational status of the available wireless enabled equipment 260b may be provided to the inventory assigned to the service requester 210 and/or the inventory assigned to the location of the service requester 210. The operation status of the wireless enabled equipment 260b may include hardware information, firmware information, software information and operation information such as use history. The wireless connection between the wireless system 212c and the wireless enabled equipment 260b may identify the specific hardware, identify and/or upgrade specific software, identify and/or upgrade specific firmware and identify any maintenance needs of the wireless enabled equipment 260c as described hereinbelow.

The equipment survey may be utilized to generate a menu of available equipment for the service requester 210 and the service requester 210 may select the specific equipment related to the service request from the menu of available equipment displayed on display 212d of the service requester device 212.

In another embodiment, the service requester device 212 identifies RFID equipment 260c through communications established between the service requester device 212 and an RFID device positioned on the RFID equipment 260c.

In another embodiment, the service provider 220 may instruct the service requester 210 to electrically connect the service requester device 212 to hardwired equipment 260d. In one embodiment, a first end of an electrical adaptor 261 (e.g., cable 261) connects to a port (e.g., USB or other serial port, dock connector, or PDMI connector) on the service requester device 212 and a second end of the electrical adaptor 261 connects to a port or connector on hardwired equipment 260d. As illustrated in FIG. 6, the electrical connection may provide direct communication between the hardwired equipment 260d and the service requester device 212. The services requester device 212 may also provide an indirect connection between the service provider device 221 and/or any system/resource connected to the service provider device 221. In one embodiment, the electrical connection connects the service requester device 212 to an EPROM (or other memory-like device) in the hardwired equipment 260d wherein the EPROM contains identification information and/or operation information of the hardwired equipment 260d. In another embodiment, the electrical connection connects the service requester device 212 to an identification circuit, such as, for example, an identifying resistor network (not explicitly shown) positioned in the hardwired equipment 260d.

After determining the purpose and nature of the service request, the service provider 220 provides assistance to the service requester 210.

Figure 7:
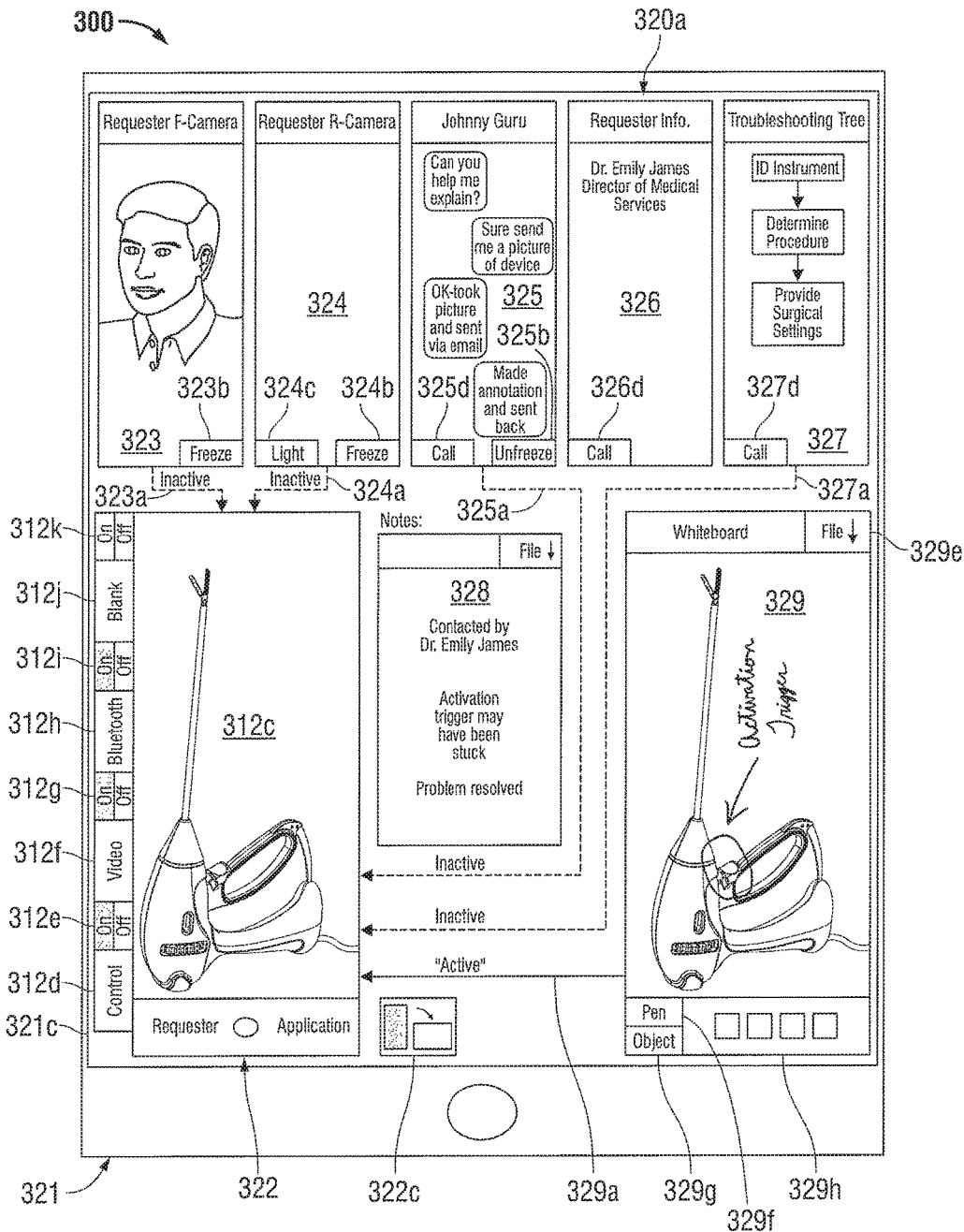
FIG. 7 is screen snap-shot of a service provider application as displayed on the display of the service provider device in accordance with embodiments of the present disclosure.

FIG. 7 is a screen snap-shot 300 according to embodiments of the present disclosure. The screen snap-shot 300 in FIG. 7 includes many aspects and concepts that may be independently utilized or utilized in any combination thereof. The screen snap-shot 300 may be a service provider application 320a proving an application display 322 on a screen 321c of a service provider device 321 or screen snap-shot 300 may be a program application window displayed on a computer display (e.g., c computer monitor, touchscreen or similar display device) of a computer system (not explicitly shown).

One aspect of the service provider application 320a includes a replication of the service requester application window 312c. In one embodiment, the service requester application window 312c replicates and/or mirrors the display of the service requester device 212. The image allows the service provider 220 to view the presentation being provided to the service requester 210 on the service requester device 212.

Service provider application 320a is capable of directing various content to the service requester device 212. Directed content may reside on, or may be generated by, the service provider device 321. For example, directed content may include live video and/or audio generated in real-time by the service provider, files residing in memory on the service provider device 321 (e.g., audio, video, text documents, images, etc . . . ) or content generated real-time by the service provider. Directed content may be retrieved by the service provider device 321 from an external source or system. For example, directed content may be a file provided from an external resource (See FIG. 4, e.g., resources 140 assigned to the service provider group 150), electronically delivered to the service provider device 321 or directed content may be obtained from another system or resource (e.g., World Wide Web content).

The service requester application window 322c displayed on the screen 321c of the service provider device 321 may also provide one or more selectors 312d, 312f, 312h and 312j that control various aspects of the service requester device 212 and indicators 312e, 312g, 312i and 312k that display the control status of the one or more selectors 312d, 312f, 312h and 312j. Control selector 312d enables or disables control of the service requester device 212 wherein the service requester 220 may elect to disable control on the service requester device 212 to prevent the service requester 210 from unintentionally changing one or more settings on the service requester device 212. Service provider 210 may control various aspects of the service requester device 212 by pressing the control selector 321c and the control status is indicated by the control status indicator 312e. Other examples of selectors and corresponding indicators may include an enable/disable video selector 312f and video indicator 312g, an enable/disable Bluetooth selector 312h and Bluetooth indicator 312i and/or additional programmable selector 312j and programmable indicator 312k that can be configured to control other aspects of the service requester device 212.

With continued reference to FIG. 7, one or more additional display windows 323-329 may be provided on the screen 321c by the service provider application 320a. Examples include a front-facing camera window 323 displaying the image captured by a front-facing camera of the service requester device 212, a rear-facing camera window 324 displaying the image captured by a rear-facing camera of the service requester device 212, one or more resource windows 325-327 that connect to various resources such as, for example, an individual resource window 325 (e.g., Jonny Guru) or a service requester information window 326 (e.g., displaying requester information), a troubleshooting tree window 327, a notes window 328 that may be used by the service provider 220 to generate notes related to the service request and a whiteboard window 329.

Service provider may "activate" a window by selecting the window 323-325, 327 and 329 or by selecting the interconnecting line 323a-325a, 327a and 329a that connects the corresponding window 323-325, 327 and 329 and the service requester application window 312c. Activating a window shares the content of the activated window in the service requester application window 312c (e.g., on the display 212d of the service requester device 212). For example, as illustrated in FIG. 7, the whiteboard window 329 is active, as indicated by the interconnecting line 329a being highlighted and displayed as "Active". As such, the whiteboard window 329 is shared with the service requester application 320a while the remaining windows 323-325, 327 are inactive (the front-facing camera window 323, the rear-facing camera window 324, the individual resource window 326 and the informational resource window 327) and therefore not shared with the service requester 210. Activating a new window may automatically disable the previously activated window. In one embodiment, activating a new window is performed by using the touch screen to drag-and-drop the desired window into the service requester application window 312c.

One or more windows may not be configured for sharing with the service requester 210 (e.g., non-sharable windows 326 and 328) as indicated by the lack of a connection between the non-shareable windows 326, 328 and the service requester application window 312c. For example, the service requester information window 326 and the notes window 328 may include information that should not be shared with the service requester 210, therefore, the service provider application window 322 automatically disables the ability to share the window and removes the interconnection between the windows 326, 328 and the service requester application window 312c.

Live video windows, e.g., front-facing camera window 323, rear-facing camera window 324 and/or individual resource window 325, may include a freeze selector 323b-

325*b* that captures the active frame of the live video from the respective camera window 323-325. The video window (e.g., requester rear-facing camera window 324, requester front-facing camera window 323 and the individual resource window 325 (e.g., Jonny Guru window)) freeze/unfreeze selector 323*b*-325*b* is positioned in the lower right corner of the respective window 323-325 and displays the text "freeze" when the window displays live video and selecting the freeze selector captures and displays the current video frame. The text "unfreeze" is displayed when the respective window displays a captured frame and selecting the unfreeze returns the window to live video.

The live video window typically displays a low-resolution video feed to limit the amount of bandwidth required to transmit the live video window. The low-resolution video feed may be limited with respect to the number of frames per second and limited with respect to the resolution of each of the frames in the video feed. In one embodiment, selecting the freeze selector 323*b*-325*b* changes one or more properties of the video feed that results in capturing a high-resolution image as the frozen image. In another embodiment, selecting the freeze selector 323*b*-325*b* changes the capture mode of the corresponding camera from a video feed to a picture mode, thereby providing an image captured as a picture.

The live video window 324 may also include a light enable/disable selector switch 324*c* that enables/disables a light (e.g., a flash) associated with the camera capturing the video/pictures for the live video window (see requester front-facing camera window 324). The service provider 220 may enable/disable the light to facilitate use of the service provider device 212 in poor light conditions.

At any point during the service request the service provider 220 may call (e.g. invite) additional resources to join the service call. For example, the call selector 325*d*-327*d* in the bottom left corner of the individual resource window 325 (e.g., Jonny Guru window), the bottom left corner of the service requester information window 326 and the bottom left of the troubleshooting tree window 327, when selected, provides a list of group resources that may be requested and utilized as a resource.

Images and/or documents may be brought into the whiteboard window 329 via a source drop-down box 329*e*. When selected, the source drop-down box 329*e* allows the service provider 220 to select from a number of source locations. One source location includes the display windows 323-325 and 327 on the service provider application display 322. Selecting a display window 323-325 and 327 captures an image from the selected window and displays the image in the whiteboard. Alternatively, the service provide 220 may simply drag-and-drop the image from a display window 323-325 and 327 into the whiteboard window 329 as described above.

The source drop-down box 329*e* also allows the service provider 220 to select files from the service provider device 221 or from any file storage system connected to the service provider device 221. The files may include an image file, a text file or any other file that may be converted for display on the whiteboard. Images and/or documents on the whiteboard window 329 may be repositioned and/or resized using one-finger or two-finger gestures.

The source drop-down box 329*e* may also allow the service provider 220 to select from a library of images. In one embodiment, the content of the library is dynamically selected to provide images related to the particular service request. The dynamic selection may be determined by the equipment identified during the service request, the page displayed on the troubleshooting tree window 327, information included in the service requester information window 326, the location of the service requester 210 or any other information that identifies the nature of the service request.

The whiteboard window 329 allows annotations (e.g., edits, modifications and/or erasing) of the image displayed in the whiteboard window 329. Image annotations may be performed while the images are active and displayed on the service requester application window 312*c* or annotations may be performed while the image displayed on the whiteboard window 329 are inactive wherein the images may be shared (e.g., made active) with the service requester application window 312*c*.

Annotations may be selected from pen annotations, object annotations and text annotation. The pen annotation selector 329*f* provides free hand drawing on the whiteboard window 329 with a stylus and/or fingertip. Object annotations selector 329*g* provide one or more shapes to be selected and the object (of the selected shape) is drawn on the whiteboard window 329 with a stylus and/or fingertip. A text annotation selector 329*h* provides a string of text characters to be entered by a keyboard and positioned in a text box.

In one embodiment, each annotation is sent between the service requester application 212*a* and the provide provider application 221*a* as a message containing content for recreating the annotation. A message may contain content for recreating one or more annotation or message may contain content recreating an original annotation and subsequent edits, revisions or additions to the original annotation.

In one embodiment, annotations are performed using the menu structure on the whiteboard window 329. In another embodiment, tapping the service requester application window 312*c* (on the service provider application display 322) or tapping the service requester device 212 provides an annotation menu that allows annotations to be drawn directly on the service requester application window 312*c*. Annotation menu may also include a refresh annotation button and/or a clear annotation button that clear all annotations on the service requester application.

Annotations performed by the service requester 210 on the service requester device 212 and annotations performed by the service provider 220 on the service provider device 221 are sent between the service requester application 212*a* and the service provider application 221*a* via XMPP messages.

Annotations performed by the service provider 220 are indicated as service provider annotations and annotations performed by the service requester 210 are indicated as service requester annotations. Annotations may be indicated by colors, line weight, line type, font size, font type or any other suitable method that uniquely differentiates the annotations.

Shape annotations include one or more parameters required to redraw and position the redrawn shape annotation. For example, circle annotations would require a center point, a radius and an indicator (e.g., service provider annotation or service requester annotation). Other attributes (e.g., line weight or line type) may be provided as additional parameters.

A text annotation would require a position parameter that identifies the location of the text body, the message for the text annotation and an indicator (e.g., provider annotation or requester annotation). Other attributes (e.g., font type, font size, font style, font color and any other text body attribute) may be provided as additional parameters.

Pen annotations may require a message containing a series of points and an indicator (e.g., provider annotation or requester annotation). Other attributes (e.g., color, line weight, or line type) may be provided as additional parameters.

Each annotation may be provided as a single messages or a message may contain a plurality of annotations in order to provide a near-real-time transfer of the annotations between the service requester application 212a and the service provider application 221a and to optimum the use of bandwidth.

In one embodiment, an annotation (e.g., shape annotation, pen annotation and/or text annotation) is drawn on the service requester device 212 by the service requester 210. The service requester application 212a generates an annotation message that includes annotation parameters required to redraw the annotation and sends the annotation message to the service provider application 221a. The service provider application 221a redraws the annotation according to the annotation parameters on the service provider device 221.

In another embodiment, an annotation originally generated by the service requester 210 on the service requester device 212 is modified by the service provider 220. For example, the service requester 210 may draw a free-hand circle that identifies a first attribute of the image displayed on the service requester device 212. The service requester device 212 generates and sends an annotation message to the service provider application 221a, which, in turn redraws the annotation in the service requester application window 312c. The service provider 220 may select and move the annotation created by the service requester 210 to identify a second attribute of the image displayed in the service requester application window 312c. Service provider device 221 generates and sends a new annotation message to the service requester application 212a and the service requester application 212a redraws the annotation on the service requester device 212.

The source drop-down box 329e may include a save function that allows the service provider 220 to save and/or send the annotated graphics generated during the service request.

A troubleshooting tree window 327 provides a troubleshooting template for the service provider 220. The troubleshooting tree window 327 may be an interactive troubleshooting tree, a text-based troubleshooting tree a text-searchable troubleshooting document or any other suitable troubleshooting document or system.

The individual resource window 325 is an example of an individual resource that may be brought into the service request to provide expert information and assist with the service request. For example, a subject matter expert may be invited to join the service request through the service communication network 100 or through a third party conferencing system that interfaces with the service provider application 221a.

Service provider application 221a may also include a vertical/horizontal selector 322c. Selection of the vertical/horizontal selector 322c rotates the windows 312c and 323-329 in the service provider application 321a (and subsequently the image in the service requester application 212a) 90 degrees switching the view from a portrait view to a landscape view.

Upon completion of the service request, the service communication network 100 may be configured to generate a service log and/or a service request report that includes one or more of the following: time and date stamp of the service request; duration of the service request; identification of the service requester 210; identification of the resources and/or group notified of the service request; the identity of the service provider 220 that accepted the service request, the identification of the service requester device 221; the location of the service requester device 221; a video and/or audio transcript of the service request; a written transcript of the audio; graphics displayed on the service provider application 221a; annotations made to the graphics displayed during the service request; and notes entered and saved during the service request.

In another embodiment, the service log may be used to generate a microsite with information from the conversation and links to the microsite may be provided to the service requester 210, the service provider 220 and the selected service group and/or resources notified for the service request for review and/or use during a subsequent service request.

In embodiments, the service requester device 212 may be used to communicate with wireless-enabled equipment (target equipment) located proximate the service requester device 212. Thus, as a service requester device 212 is carried through a facility by the device user (e.g., a doctor or a service technician), the service requester device 212 communicates with nearby wireless-enabled target equipment. Communication may be limited to identification of the wireless-enabled target equipment or communication may include execution of various service-related functions.

A service requester application 221a running on the service requester device 221 may include a routine that periodically searches for wireless-enabled target equipment. The search routine may be periodically performed during a low-power communication mode of the service requester device 212 to conserve power. While the service requester device 212 is establishing a connection with the target equipment, or after the service requester device 212 establishes a connection with the target equipment, the service requester device 212 may store information relating to the target equipment, including a physical location, a unique equipment identifier, software/firmware identifiers (e.g., version information), hardware identifiers, software/hardware parameters, and/or the current user (e.g., hospital address determined based on the physical location).

As the service requester device 212 is carried through a facility, the service requester device 212 may prepare a report of the status of the target equipment in the facility. After the service requester device 212 is carried out of the facility, the service requester device 212 may transmit the report to a central computer system. This information may be archived in the central computer system for future use. For example, this information may be used by members of the service provider group on a future service request call to determine if equipment includes the most recent software version or to determine if the equipment is operation and/or safe for use.

The service requester device 212 may also generate an alert or message to notify the user of the service requester device 212 of the status of the target equipment. For example, the service requester device 212 may generate a message indicating that the target equipment requires service and/or generate a message indicating that the software of the target equipment requires and update or upgraded. In embodiments, the central computer system may issue a command to the service requester device 212 to perform an electronic upgrade of the target equipment. In response to the command, the service requester device 212 may wirelessly update the software of the target equipment. Alternatively, the central computer system may provide instructions to the user of the service requester device 212 to connect the service requester device 212 to the target equipment via a cable to allow the central computer system to perform service-related functions.

The central computer system or a service provider group associated with the central computer system may provide other instructions to the user of the service requester device 212. For example, the service provider group may instruct the user of the service requester device 212 to position the camera of the service requester device 212, how to physically configure the target equipment (e.g., connect a particular cable to the target equipment and another device), and how to operate the target equipment for a particular purpose (e.g., for troubleshooting purposes). In some embodiments, the service requester device 212 may generate a work order for replacement parts or service for the target equipment based on the communications between the service requester device 212 and the target equipment.

In embodiments, once the service requester device 212 establishes communications with target equipment, the service requester device 212 may further establish communication with a service provider group associated with the central computer system to facilitate communications the target equipment. The service provider group may obtain control of the service requester device 212 to facilitate the required service on the target equipment.

The service requester application 212a may download settings that are specific to a user (e.g., a Doctor) to the target equipment. The service requester application 212a may also upload settings that are specific to the user from the target equipment. The uploaded settings may be saved for future use by the user. For example, a doctor may perform a surgical procedure using an electrosurgical system programmed with a specific set of user programmable settings. After the surgical procedure, the doctor may upload the specific set of user programmable settings from the electrosurgical system thereby storing the settings in the service requester device 212. As discussed hereinabove with respect to FIG. 4, the specific set of programmable settings may be provided to a centralized database, such as the service requester information 140d (e.g., information related to the service requester 110h selected from one or more databases). In preparation for a future surgical procedure, the doctor may retrieve the service requester information 140d, review the specific set of user programmable settings used during the prior surgical procedure and may utilize the service requester device 212 to download the a set of user programmable settings to the electrosurgical system being used for the future surgical procedure.

Returning to FIG. 5, the bandwidth of the active communications channel (e.g., in a Wi-Fi or 3G network) in the service communication network 200 between the service requester device 212 and the service provider device 221 may fluctuate from time-to-time. The service communication network according to the present disclosure adapts to the available bandwidth of the active communications channel. As the bandwidth of the active communications channel decreases, the video quality decreases until the service requester device 212 stops transmitting video. When the service requester device 212 stops transmitting video, however, all other services, including audio, annotations on frozen frames, and sending snapshots or files, continue to work if the connection between the service requester device 212 and the service provider device 221 is not broken. If the bandwidth of the active communications channel is insufficient for an audio phone call, then the audio phone call is dropped or does not connect at all. If the bandwidth of the active communications channel increases above a predetermined bandwidth, then video transmission resumes. If the bandwidth continues to increase, then the video quality increases until the video quality is limited by the processing power of the service requester device 212.

The bandwidth may be measured by transmitting real data in a video call mode or test data in an audio-only mode through the data communications channel. During the video call mode, video stream data is sent and no test data is sent. During the audio-only mode, some test data is generated and transmitted. The bandwidth may be measured by either the service requester application 221a, The Cloud 230 server 202, 203, 204, or by the service requester application 212a. The service communication network 200 may execute a calibration daemon that is configured to receive test data, calculate the bandwidth, and return bandwidth information to the server requester application 221a. In embodiments, the bandwidth may be measured on the side of a server 202, 203, 204 because some data is stored in the socket's buffers on the service requester device 212 and/or the service provider device 221. In the audio-only mode, bandwidth may be measured by transmitting test data from the service requester device 212 directly to the service provider device 221. To minimize the impact of the test data on the voice data, the test data may be transmitted from the service requester device 212 to the service provider device 221 with low priority.

The service communication network 200 may incorporate techniques to optimize the quality of the video data stream and the switching between audio and video modes to provide the best user experience. As discussed hereinabove, communications, data and information is streamed through one or more streaming server applications 202 that reside in The Cloud 230. These optimization techniques may be implemented through a service requester application 212a running on the service requester device 212 and a streaming server application 202 (e.g., a video-proxy application) running on a server in The Cloud 230 connected between the service requester device 212, the service provider device 221 or any other suitable computer, server and/or system incorporated into the service communication network 100 described herein. The streaming server application 202, while executed by a server in The Cloud 230, is not tied to a particular server and is used generically to describe a video-proxy application that resides and executes in a server.

The service requester application 212a and/or a communications server (server 202-204) residing in The Cloud 230 maintain a video quality index including video quality index values normalized between 0 to a maximum video quality index value. In embodiments, a higher index value means higher video quality that requires higher bandwidth. The video quality may be measured in terms of resolution, frames per second, or any other suitable property. To provide the highest video quality with a given bandwidth, which may be unstable, the service requester application 212a may be configured to satisfy the following conditions: (1) the frame send operation queue must be able to take each newly created frame and pass it on to the data communications channel, (2) the sent frames confirmation queue size must be less than an allowed value, and (3) signals from the streaming server application 202 must confirm that there is sufficient video data flow.

With respect to the first condition, there is an operations queue in the service requester application 212a that executes special operations that are configured to prepare every frame by providing it with additional information and pushing it to the data communications channel. In embodiments, only one special operation is performed at any given time.

Whenever another frame is prepared (by the service requester device 212) to be sent or passed to the operation queue, the service requester application 212*a* checks for the current number of operations in the operations queue. If this number of operations in the operations queue is more than one, which means that the current operations are delayed for some reason (e.g., low bandwidth), the service requester application 212*a* removes all inactive operations from the operations queue and reports this to the optimization module. The removed inactive operations may include skipped frames. For each skipped frame there is quality decrease operation.

Each time a frame is skipped, the optimization module increments a skipped-frame counter by one. On the other hand, each time a frame leaves the operations queue, the optimization module decrements the skipped-frame counter by one but not lower than 0. The optimization module may also increment the skipped-frame counter by one if less than five seconds elapses between skipped frames. If, on the other hand, a predetermined amount of time elapses between skipped frames, the optimization module decrements the skipped-frame counter by one. The predetermined amount of time is determined by a user's perceived quality of the video. Parameters used in the optimization module may be configured such that video perceived by a user as poor quality increments the skipped-frame counter and video perceived by a user as good quality decrements the skipped-frame counter. In one embodiment, the predetermined amount of time that elapses between skipped frames is about five seconds.

Whenever the skipped-frame counter reaches a critical number of skipped frames, the optimization module reports this to a rest application, which switches the service requester device 212 to audio-only mode. The critical number of skipped frames may depend on the current video data flow rate. The critical number of skipped frames may be selected based on a user's perception of unacceptable video quality or selected by the current frames per second (FPS) value multiplied by an unacceptable amount of video delay in seconds. For example, in embodiments, the critical number of skipped frames may be equal to the current frames per second (FPS) value multiplied by 4, i.e., the number of frames for 4 seconds of video.

As stated above, to provide the highest video quality with a given bandwidth, the service requester application 212*a* may be configured to require that the sent frames confirmation queue size is less than an allowed value. For every frame that is transmitted from the service requester device 212, the service requester device 212 may receive a confirmation signal. Whenever a frame is created and placed in the frame send operations queue, a new confirmation timer is set for a confirmation time interval and added to the sent frames confirmation queue. The confirmation time interval may depend on the video FPS, latency to the streaming server application 202, and a constant delta. In embodiments, the confirmation time interval may be calculated according to the following expression:

confirmation time=1/fps+latency+delta (seconds)

The latency value may be obtained from a time sync operation. The delta value is configurable and may be set equal to 0.5. The confirmation time refers to the maximum wait time for a frame confirmation signal. If any confirmation timer elapses, then the optimization module decreases the video quality. After a change in video quality is performed, further adjustments or changes may be delayed to account for hysteresis or de-bouncing. In addition, if any frame is not confirmed, i.e., no confirmation signal or dropped signal is received, for a maximum allowed time interval, then the service requester application 212*a* is switched to the audio-only mode. Frames may not be confirmed because there may be some critical problems in the data communications channel or on the streaming server application 202. The confirmation time interval depends on maximum allowed delay and latency to the streaming server application 202. The confirmation time interval may be calculated according to following expression:

maximum wait time=maximum allowed delay+latency

The maximum allowed delay is a pre-defined value and, in embodiments, may equal four seconds. Latency is dependant on the video quality and the ability of the system to effectively transmit data (e.g., video, audio and other data) across the network. As such, latency is variable and dependent on at least the selected video quality.

If the number of confirmation timers in the confirmation queue is less than an allowed size value, then a new frame is added to the frame send operations queue and this is reported to the optimization module. The allowed size for the confirmation queue depends on the confirmation timer time interval and the video data flow rate. The allowed size may be calculated according to the following expression:

allowed confirmation queue size=confirmation time×fps

If the number of confirmation timers in the confirmation queue is more than the allowed size, then a frame is skipped and this is reported to the optimization module. If the number of confirmation timers in the confirmation queue is less than an allowed size value, then a frame is added to the frame send operations queue and this is reported to the optimization module.

As described above, to provide the highest video quality with a given bandwidth, the service requester application 212*a* may be configured so that the signals from the streaming server application 202 confirm that there is sufficient video data flow. The streaming server application 202 sends the service requester application 212*a* signals regarding the video data flow. These signals may include a "frame was received" signal, a "frame was dropped" signal, and a "video cutoff" signal.

The streaming server application 202 may calculate the number of frames dropped in sequence and send the "video cutoff" signal to the service requester application 212*a* if the number of dropped frames is more than the number of frames that would normally be provided in a video stream during a predetermined dropped-frame period. The current FPS value may be taken from the HTTP MJPEG header of the frame (the header also includes frame quality and compression level information). In embodiments, the default current fps value is 3 FPS. Thus, if the predetermined dropped-frame period is 2 seconds, then 3 fps×2 seconds=6 frames should be dropped in sequence before the server application sends the "video cutoff" signal to the service requester device 212.

If the service requester application 212*a* receives a "frame was dropped" signal, the service requester application 212*a* decreases the video quality. If the service requester application 212*a* receives the "video cutoff" signal, the service requester application 212*a* switches the service requester application 212*a* to the audio-only mode. For both the "frame was dropped" and "frame was received" signals, the service requester application 212a unschedules the confirmation timer for an appropriate frame number and removes it from sent frames confirmation queue.

If all conditions are satisfied, i.e., there are no dropped and skipped frames for a last period of time and no cutoff signals are received, during the capture and send process, the service requester application 212a increases the video quality. If frames are added to the frame send operations queue and no frames were dropped or skipped during an allowed time, the optimization module increases the video quality by incrementing the video quality index value and applying an appropriate video quality setting. The quality increase time depends on a previous decrease quality number and may be calculated according to the following expression:

quality increase time=base time×(1+decrease quality number/4)

The base time is configurable and may be set to 20 seconds. The maximum allowed value for the quality increase time may be 90 seconds.

The communication system according to the present disclosure may incorporate a feedback mechanism in which the service provider device 221 transmits the amount of data actually received by the service provider device 221 to the service requester device 212. The service requester application 212a running on the service requester device 212 may use this bandwidth data to optimize the video stream.

As illustrated in FIG. 5 and described above, the service communication network 200 includes two applications: a service requester application 212a running on a service requester device 212 and a service provider application 221a running on the service provider device 221. In embodiments, the service requester application 212a and the service provider application 221a work together as a single media transfer and receiver system. The service requester application 212a obtains a video stream from one or more cameras 212b (See FIG. 6) of the service requester device 212 and transmits the video stream to the service provider application 221a through private and public networks. In embodiments, the service requester application 212a may reside behind a firewall 232b that prohibits the service provider application 221a from issuing a request to receive video data from the service requester application 212a. Thus, the service communication network 100 may also include a server application 205 located at a public network such as The Cloud 230. The server application 205 is generically referenced in FIG. 5 as residing in The Cloud 230 and may be incorporated into any one of the streaming server application 202, the annotation/session server application 203, the file server application 204 or function as an independent application that reside and execute on a server in The Cloud 230. Both the service requester application 212a and the service provider application 221a may connect to the server application 205 and the server application 205 multiplexes the data flow between the service requester and service provider applications 212a, 221a. Both the service requester and service provider applications 212a, 221a connect to the server application 205, which may be incorporated into using predetermined pair information. Once the service requester and service provider applications 212a, 221a connect to the server application 205, the server application 205 behaves like a tunnel or data pipeline between the two connections. The server application 205 may send feedback to or from the service requester and service provider applications 212a, 221a.

The server application 205 may include the following modules: a setup module, a registration module, a pairing module, a communication processing module, and an admin module. The setup module reads configuration parameters (e.g., source data and signal ports and number of threads) from a server configuration file. The setup module uses the configuration parameters to open two listening sockets for requester and service provider application 212a, 221a data connections, two listening sockets for requester and provider signal connections, and/or an administration port. The registration module identifies and validates incoming requester and provider connection requests. The pairing module evaluates the proper peers of the service requester and provider connection pairs.

The communication processing module processes the data multiplexing between the service requester and provider connections. The admin module handles administration information requests on the admin port. Admin requests may include requests to view the overall system state or to view different logs.

Figure 8:
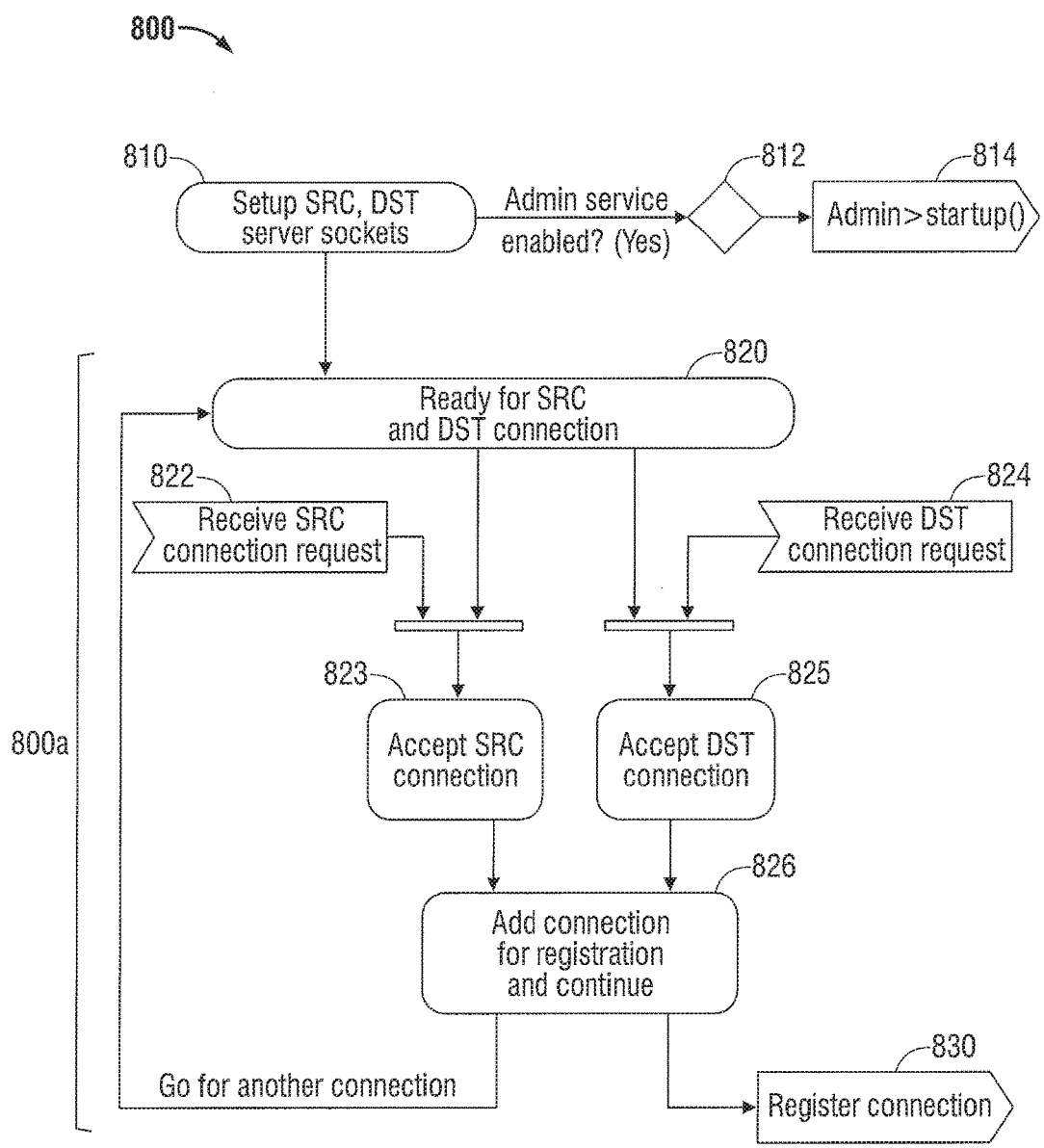
FIG. 8 is a flow diagram of a setup thread for the setup module according to embodiments of the present disclosure.

FIG. 8 is a flow diagram of a setup thread 800 for the setup module according to embodiments of the present disclosure. In Step 810, the setup module reads the configuration parameters from a configuration file for the server application 205 and sets up all of the modules of the server application 205 accordingly. If the administrative service is enabled (Step 812) an administration startup procedure is executed (Step 814). The setup module creates a main thread 800a for accepting incoming connection requests (Step 820). The setup module also creates a thread for each of the registration module, the pairing module, and the communication processing module.

The main thread 800a creates four server sockets (two data sockets DST connections and two signal sockets SRC Connections). Main thread 800a listens on the source and destination ports (Step 820) for any incoming source or destination data and signal connections. When an incoming connection request comes in on any of the ports (Step 822, Step 824) the main thread 800a accepts the request (Step 823, 825) and creates a new socket or pipe for that connection (Step 826). Then, the main thread 800a hands over the new connection socket to the registration thread (Step 830) so that the main thread 800a can make itself free to accept other incoming connection requests. After the main thread 800a hands the new connection socket to the registration thread (Step 830), the main thread 800a again waits for new connection requests (Steps 822 and 824).

Figure 9:
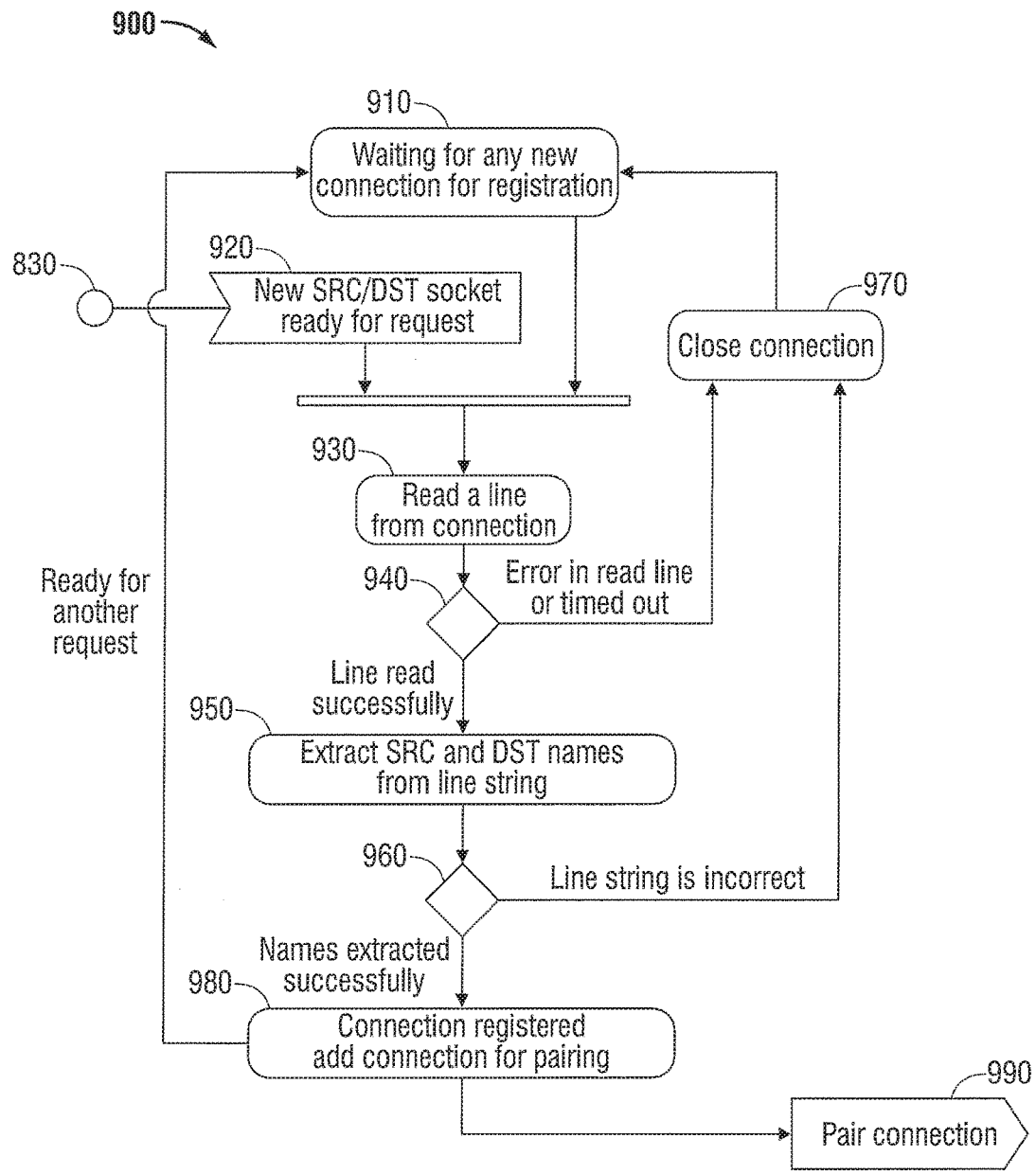
FIG. 9 is a flow diagram of a registration thread for registration of new communication sockets.

Referring now to FIG. 9 shown above, the registration thread 900 stays in a waiting state (Step 910) to wait for new sockets for registration. When the main thread 900a pushes a new socket (Step 920) to the registration thread 900, the registration thread 900 reads pairing information of the socket (Step 930). For data connections, the pairing information is used to create a pipe between the service requester and provider sockets. For signal connections, the pairing information associates the signal and data connections that are opened from the same device (Step 950). In embodiments, the pairing information for both requester and provider connections may have the following format:

src_name=<iPhoneUUID>&dst_name=<iPadUUID>&[EOL].

After reading the pairing information, the registration thread 900 registers the connection type (e.g., requester or provider), the connection name, and the peer name for the connection (Step 980). The connection type is determined based on the port requested by the service requester or service provider application 212a, 221a. As shown in the pairing information above, the connection name and the peer name may be a universally unique identifier (UUID). The connection name and the peer name may be read from the peer information.

In the registration process, the server application 205 may hold a particular connection for up to a maximum registration wait time, which may be set in the configuration file. If the server application 205 cannot read the pairing information (Steps 930) for the connection within the maximum registration wait time, a time out error or read line error is detected (Step 940) and the server application 205 closes that connection (Step 970). The registration thread 900 extracts the SRC and DST names from the line string (Step 950) and if the pairing information is read properly (Step 960), the registration thread 900 registers the connection for pairing (Step 980) and forwards the registered connection to the pairing thread (Step 980). The registration thread 900 then waits for a new connection for registration (Step 910).

Figure 10:
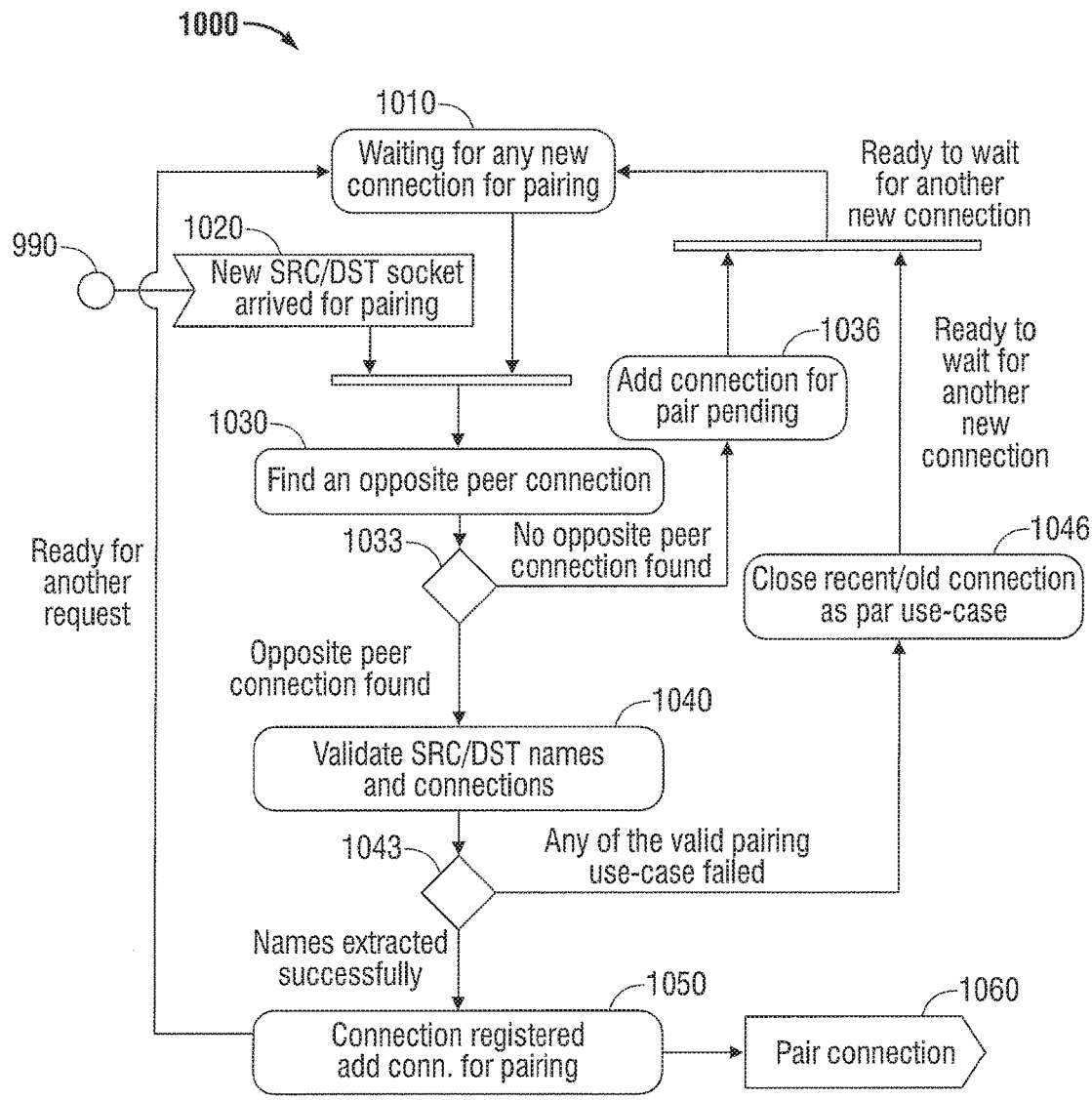
FIG. 10 is a flow diagram of a pairing thread for the pairing registered connections.

FIG. 10 is a flow diagram of a pairing thread 1000 for the pairing module. The pairing thread 1000 may be a dedicated thread that waits for new connections for pairing (Step 1010). After the registration thread 1000, the server application 205 has the identification information of any connection. After receiving a new registered connection (Step 1020), the pairing thread 1000 attempts to match pair information of registered connections (Step 1030). When the pairing thread finds a match (Step 1033) of pair information between two data and two signal source and destination connections (Step 1033), it validates the SRC/DST names and connections (Step 1040), and if validated (Step 1043) the pairing thread 1000 creates a pair of data connections (Step 1050) and prepares the pair for processing (Step 1060).

In the pairing process, the server application 205 may hold a particular connection for up to a maximum pairing wait time. The maximum pairing wait time may be set in the configuration file of the server application 205. If a particular connection cannot have a peer connection (Step 1033), then the server application 205 closes that connection (Step 1036). If the pairing thread finds a match of source and destination names between similar kinds of connections (e.g., SRC-SRC data, DST-DST data, SRC-SRC signal, and DST-DST signal; Step 1033), then it closes the older similar connection and keeps the newer similar connection for future pairing (Step 1046). If the pairing thread finds a match in the source name but a mismatch in the designation name of the pairing information of two different types of connections (Step 1043), then it closes the recent connection (Step 1046).

Figure 11:
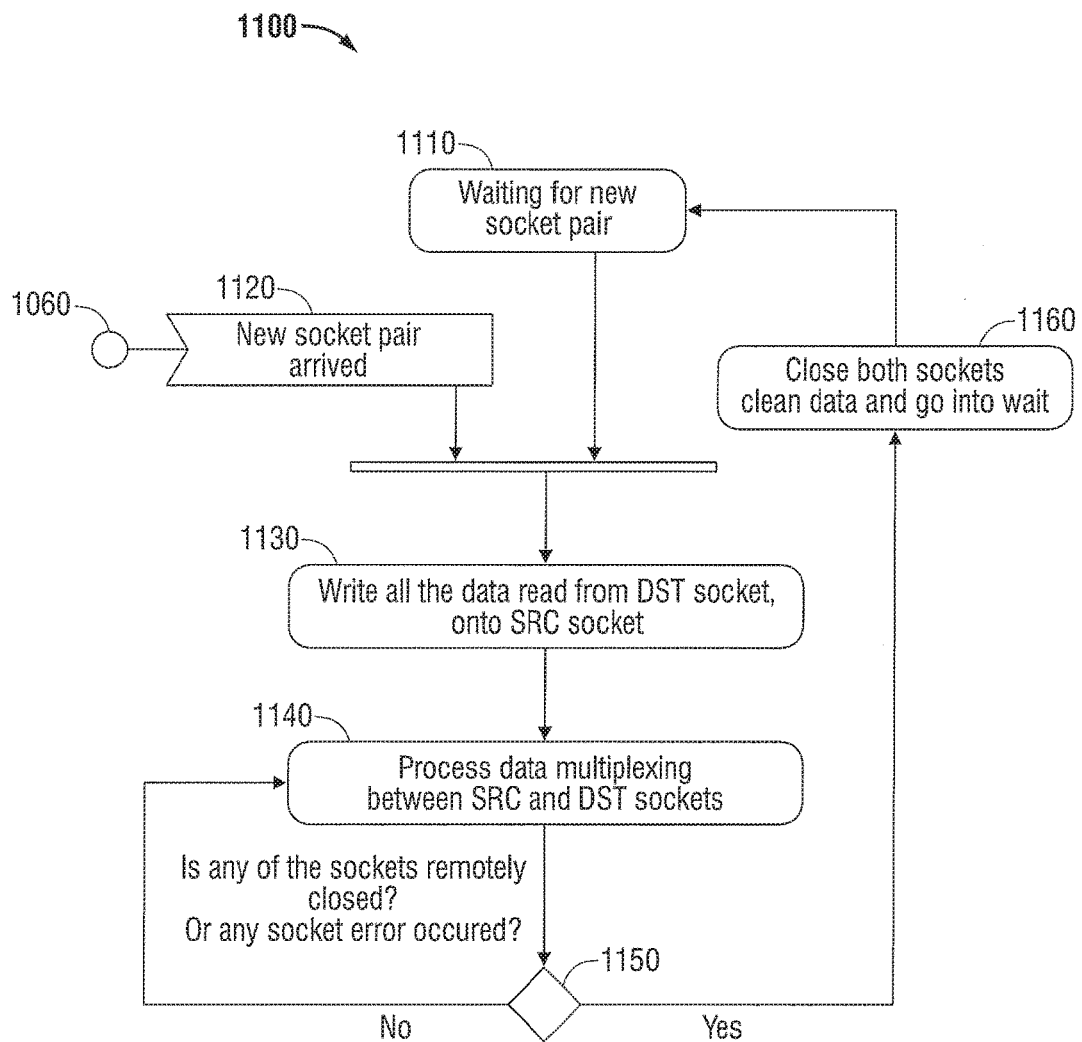
FIG. 11 is a flow diagram of a pairing processing thread for processing the paired source and destination sockets.

FIG. 11 illustrates a pair processing thread 1100 for processing the paired source and destination sockets from the pairing thread 1100. There may be multiple pair processing threads 110 that are either waiting to process new socket pairs or that are already processing new socket pairs. The maximum number of pair processing threads 1100 may be configured in the server application 205 configuration file.

When a new socket pair arrives for processing (From Step 1160), one of the multiple pair processing threads 1100 that is waiting to process a new socket pair (Step 1110) starts processing the new socket pair (From Step 1160). First, the pair processing thread sends a response header (e.g., an HTTP response header) for the video data-type (e.g., MJPEG) to the destination socket (Step 1130). Next, the pair processing thread reads video data frames (e.g., MJPEG frames) from the source socket and forms video data packets including a separator, headers, and a video data frame (Step 1140). Then, the pair processing thread sends the video data packets to the destination socket (i.e., the provider connection).

In embodiments, the server application 205 holds the last read frame in a buffer. The server application 205 configuration file may include a configuration parameter that enables dropping frames from the buffer. If the server application 205 finishes reading a new video data frame and the configuration parameter is set to enable dropping frames, then the server application 205 drops an old frame from the buffer and adds the new frame to the buffer. If, on the other hand, the configuration parameter is not set to enable dropping frames, then the server application 205 stops reading new frames until an old frame is cleared from the buffer.

The server application 205 may determine whether the number of frames that are dropped in sequence is more than a threshold number of dropped frames. If the number of frames that are dropped in sequence is more than the threshold number of dropped frames, then the server may send a signal to the service requester application 212*a* to stop sending frames to the server application 205 and to switch to the audio-only mode. This signal may be sent using the signal connection described above.

In embodiments, the threshold number of dropped frames may equate to the number of dropped frames over a predetermined period. For example, if the current FPS is 3 FPS and the predetermined period is 2 seconds, then the threshold number of dropped frames is 3 FPS×2 sec.=6 frames.

If any of the sockets are closed or if there is a socket error (Step 1150), then the socket pair is closed (Step 1160) and the pair processing thread 1100 again waits to process a new socket pair. The server application 205 may dedicate a single thread for processing each new socket pair.

Figure 12A:
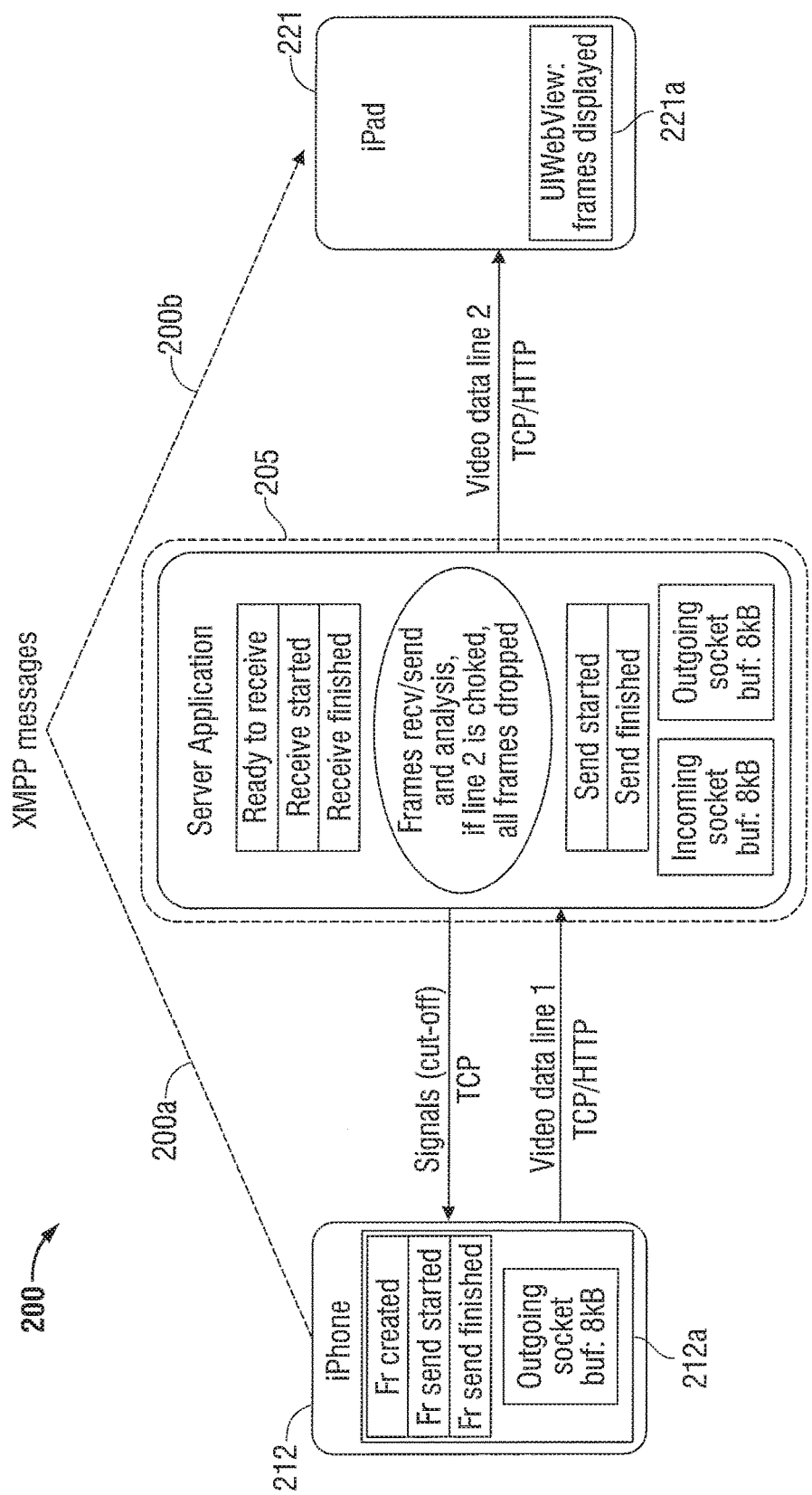
FIG. 12A is a block diagram of a service requester and service provider paired through a server application according to an embodiment of the present application.
Figure 12B:
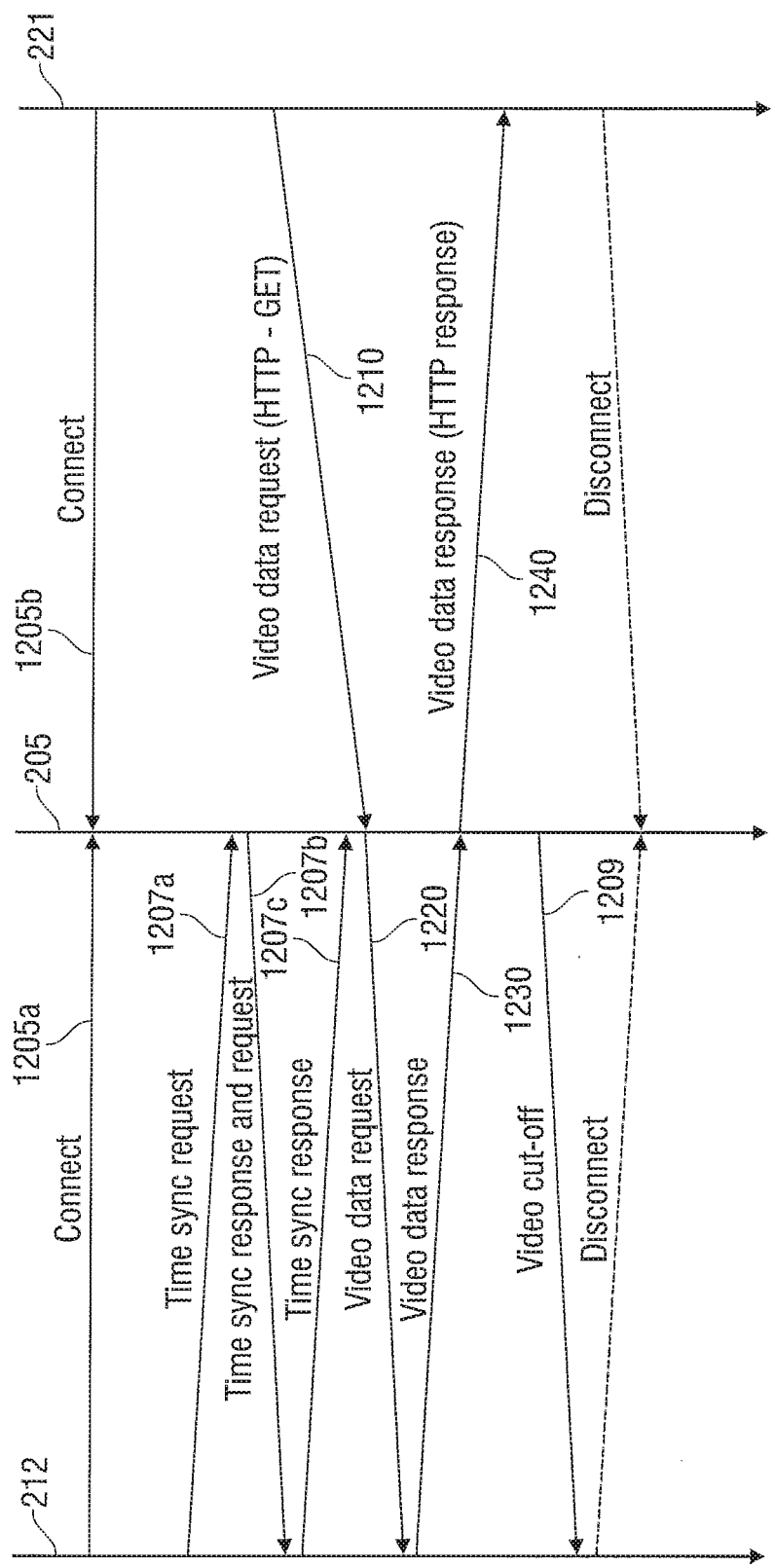
FIG. 12B is a timing diagram for communication through the server application.

As illustrated in FIGS. 12A and 12B, the service communication network 200 may support signal connections 200*a*, 200*b* between the server application 205 and the respective service requester device 212 200*a* and service provider device 221. The signal connections 200*a*, 200*b* may be used to perform a variety of functions including synchronizing the time between the service requester device 212 and the server application 205 and to send feedback information from the server application 205 to the service requester device 212. In embodiments, the signal data transmitted via a signal connection 200*a*, 200*b* may be structured as a 16-byte word in which the first 2 bytes define the signal type and the remaining 14 bytes is the payload.

The current time on the server application 205, the service requester device 212, and the service provider device 221 may be different. In some situations, however, the timestamps of the service requester device 212 and the server application 205 cannot be compared to each other so that the current time can be synchronized. To determine the time difference between the devices, the server may perform the following procedure:

1. The service requester device 212 establishes data and signal connections 1205 to the server application 205 and waits for a timesync handshake 1207*a*-1207*c* from the server application 205.

2. The server application 205 receives a connection 1205*a*, 1205*b* from both the service requester device 212 and the service provider device 221, creates a connection pair, and sends a timesync handshake message to the service requester device 212. The timesync handshake message 1207*a*-1207*c* notifies the service requester device 212 when it can start the synchronization procedure.

3. The service requester device 212 obtains its current time (rsd_tm1), puts it into a signal message (e.g., puts it into 4-7 bytes of the signal message), and sends the signal message to the server application 205. (Step 1210)

4. The server application 205 receives the signal message from the service requester device 212, obtains its current time (vps_tm1), puts it into the same signal message (e.g., puts it into 8-11 bytes of the signal message) and sends the signal message back to service requester device 212. (Step 1220)

5. The service requester device 212 receives the signal message, obtains its current time (rsd_tm2), puts it into the same signal message (e.g., puts it into 12-15 bytes of the signal message), and sends the signal message to the server application 205. (Step 1230)

6. The server application 205 receives the signal message from the service requester device 212 (Step 1240), obtains its current time (vps_tm2) and calculates a timesync value using the following formula:timesync=vps_tm2−rsd_tm2−min(rsd_rt_tm, vps_rt_tm)/2, where rsd_rt_tm=rsd_tm2−rsd_tm1−service requester device round trip time, and vps_rt_tm=vps_tm2−vps_tm1−server application 205 round trip time.

The server application 205 uses the calculated timesync value to synchronize the timestamps of the service requester device 212 and the server application 205.

As described above, the server application 205 may send feedback signals 1209 to the service requester device 212 via a signal connection. The feedback signals 1209 may include: cutoff signals, confirmation signals, and dropped frame signals. The cutoff signal notifies the service requester application 212a that video data transmitted from the service requester device 212 to the service provider device 221 must be cutoff. When the service requester application 212a receives a cutoff signal, it stops sending video data to the server application 205. In other embodiments, the server application 205 may take control of the service requester device 212 and stop the service requester device 212 from sending video data to the service provider device 221.

The server application 205 may send a cutoff signal when a variety of appropriate conditions are satisfied. These conditions may include: (1) A sequence of frames have been dropped on the server application 205 side, (2) the server application 205 has not received a frame for more than a predetermined period (e.g., 3 seconds), (3) the server application 205 started reading a frame more than a predetermined time ago (e.g., 3 seconds) but has not yet finished reading, and (4) the server application 205 received a frame that was created on the service requester device 212 more than a predetermined time ago (e.g., 3 seconds). The cutoff signals may contain information regarding the condition that triggered the server application 205 to send the cutoff signal.

A multifunctional communication device includes functionality advantageous for the system disclosed herein. It is envisioned that a fixed computer workstation could be configured to identical or substantially similar functionality. For example, a computer workstation equipped with the required hardware and software may connect to a service communication network 100. Computer workstation may be equipped with service requester software configured to original a service request, service provider software configured to accept a service request or both.

The service communication network 100, 200 disclosed herein is described in the context of a "service requester" and a "service provider." The systems and methods may be used in a variety applications that include one or more aspects of the functionality described herein. The service provider 220, in addition to the aspects described herein, may include information providers (product representatives), daily assistance providers or practically anyone in need of assistance. In one embodiment, the service communication network 100 is used to assist a visually challenged individual in identifying medicines wherein the service requester may be a relative and the resources available may be medical professionals or a local pharmacist. In another embodiment, the service communication network 100 is used to assist a technically challenged individual in connecting and using components of an electronic system.

In yet another embodiment, the service provider group is selected from one or more members of a social network wherein the members are dynamically selected based information available on the social network. For example, placing a request for assistance to connect components of an electronic system may generate a service provider group consisting of social network connections with degrees or interests in electronics. In the social networking contexts, multiple service providers may join the request for assistance using their service provider device 221. The requester and provider applications may be incorporated into an existing social networking application.

In yet another embodiment, the service communication network 200 includes an instructor (e.g., provider) and a plurality of students (e.g., requesters) wherein the instructor provides instructions to the plurality of students. For example, a remote learning environment may require a laboratory component, in addition to a standard classroom lecture component, as required coursework. A service communication network 100 may be assembled to include an instructor and the plurality of students. The instructor application provides a connection as described herein to each of the plurality of students to monitor. The instructor may simultaneously display video from each of the plurality of students. The instructor may provide the plurality of students a video feed from any assigned or available resources as described herein. The instructor may direct the video from one of the plurality of students to the remaining plurality of students to share the one student's laboratory experience.

In a further embodiment, the service requester application 212a and service provider application 221a include the functionality of a mobile telephone with access to a contact listing and capable of placing and receiving phone calls.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A system for providing remote assistance, the system comprising:
   a service requester device configured to execute a service requester application and to capture an image of a surgical device;
   a service provider device configured to execute a service provider application; and
   a computer server configured to execute a server application to establish a connection between the service requester application and the service provider application,
   wherein at least one of the service requester device, the service provider device, or the server application is configured to identify the surgical device, and the service provider device is configured to control the surgical device via the connection established between the service requester application and the service provider application.

2. The system according to claim 1, wherein at least one of the service requester device, the service provider device, or the server application is configured to identify the surgical device based on the image of the surgical device captured by the service requester device.

3. The system according to claim 1, wherein the connection is selected between one of an audio connection, an audio and video connection, an audio and still image connection, or a SMS messaging connection.

4. The system according to claim 1, wherein the computer server is configured to select the service provider device based on a location of the service requester device.

5. The system according to claim 1, wherein the service provider device is configured to identify the surgical device based on a communication between the service requester device and the surgical device.

6. The system according to claim 1, wherein the service provider device is configured to identify the surgical device based on a connection between the service requester device and the surgical device.

7. The system according to claim 1, wherein the computer server is remotely located from at least one of the service requester device or the service provider device.

8. A system for providing remote assistance, the system comprising:

a service requester device networked with a service provider device through a server application, the service requester device configured to capture an image of a surgical device, wherein at least one of the service requester device, the service provider device, or the server application is configured to identify the surgical device and the service provider device is configured to control the surgical device via a communication established between the service requester device and the surgical device.

9. The system according to claim 8, wherein the service requester device includes a video monitor and wherein the service provider device is configured to direct content to the video monitor of the service requester device.

10. The system according to claim 9, wherein the service provider device is configured to display an annotation on the video monitor of the service requester device.

11. The system according to claim 9, wherein the service provider device is configured to display content on the video monitor of the service requester device.

12. The system according to claim 11, wherein the content displayed on the service requester device is a video.

13. The system according to claim 11, wherein the content displayed on the service requester device is an image.

14. The system according to claim 8, wherein at least one of the service requester device, the service provider device, or the server application is configured to identify the surgical device based on the image of the surgical device captured by the service requester device.

* * * * *